(12) United States Patent
Mun et al.

(10) Patent No.: US 12,710,568 B2
(45) Date of Patent: Aug. 18, 2026

(54) IMAGE SENSOR AND ELECTRONIC APPARATUS INCLUDING THE IMAGE SENSOR

(71) Applicant: SAMSUNG ELECTRONICS CO., LTD., Suwon-si (KR)

(72) Inventors: Sangeun Mun, Suwon-si (KR); Sungmo Ahn, Suwon-si (KR); Sookyoung Roh, Suwon-si (KR); Junho Lee, Suwon-si (KR); Choonlae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 18/405,938

(22) Filed: Jan. 5, 2024

(65) Prior Publication Data

US 2024/0230960 A1 Jul. 11, 2024

(30) Foreign Application Priority Data

Jan. 5, 2023 (KR) ........................ 10-2023-0001948
Oct. 19, 2023 (KR) ........................ 10-2023-0140619

(51) Int. Cl.
*G02B 3/00* (2006.01)
*H04N 23/55* (2023.01)

(52) U.S. Cl.
CPC ........... *G02B 3/0043* (2013.01); *H04N 23/55* (2023.01); *G02B 2207/101* (2013.01)

(58) Field of Classification Search
CPC .. G02B 3/0043; H04N 23/55; H10F 39/8063; H10F 39/182; H10F 39/806
See application file for complete search history.

(56) References Cited

U.S. PATENT DOCUMENTS 5,610,390 A * 3/1997 Miyano ................ G02B 3/0043 257/432
7,667,286 B2 2/2010 Toshikiyo et al.
(Continued)

FOREIGN PATENT DOCUMENTS

JP 4531843 B2 8/2010

OTHER PUBLICATIONS

Extended European Search Report dated Jun. 24, 2024, issued by the European Patent Office in European Application No. 24150167.5.

*Primary Examiner* — James A Dudek
(74) *Attorney, Agent, or Firm* — Sughrue Mion, PLLC

(57) ABSTRACT

An image sensor includes a sensor substrate including a plurality of pixels that detect light, and a nano-optical microlens array arranged on the sensor substrate and including a plurality of nano-optical microlenses that focus incident light on the plurality of pixels, wherein the nano-optical microlens array includes a plurality of lens groups, each of the plurality of lens groups includes first, second, third, and fourth nano-optical microlenses, and each of the first, second, third, and fourth nano-optical microlenses includes a plurality of nanostructures arranged to focus incident light on a corresponding pixel, and centers of the first, second, third, and fourth nano-optical microlenses in each of the plurality of peripheral groups in the plurality of lens groups are offset with respect to a center of the corresponding pixel, and offset distances of at least two of the first, second, third, and fourth nano-optical microlenses are different from each other.

20 Claims, 31 Drawing Sheets

(56) References Cited

U.S. PATENT DOCUMENTS

| | | | |
|---|---|---|---|
| 10,529,763 | B2 | 1/2020 | Gravelle, Jr. |
| 2019/0148433 | A1 | 5/2019 | Kuo et al. |
| 2019/0326341 | A1 | 10/2019 | Gravelle, Jr. |
| 2021/0048342 | A1 | 2/2021 | Kim et al. |
| 2021/0118932 | A1 | 4/2021 | Cho et al. |
| 2021/0126032 | A1 | 4/2021 | Roh et al. |
| 2021/0126035 | A1 | 4/2021 | Roh et al. |
| 2023/0020980 | A1 | 1/2023 | Mun et al. |
| 2024/0145509 | A1 | 5/2024 | Mun et al. |

* cited by examiner

FIG. 12

IMAGE SENSOR AND ELECTRONIC APPARATUS INCLUDING THE IMAGE SENSOR

CROSS-REFERENCE TO RELATED APPLICATIONS

This application is based on and claims priority under 35 U.S.C. § 119 to Korean Patent Application Nos. 10-2023-0001948, filed on Jan. 5, 2023, and 10-2023-0140619, filed on Oct. 19, 2023, in the Korean Intellectual Property Office, the disclosures of which are incorporated by reference herein in their entirety.

BACKGROUND

1. Field

The disclosure relates to an image sensor and an electronic apparatus including the image sensor.

2. Description of the Related Art

As the resolution of image sensors has increased, the size of unit pixels in the image sensors has been constantly reduced. Accordingly, a chief ray angle (CRA) has increased at an edge of an image sensor. A chief ray is incident on an image sensor perpendicularly at the center of the image sensor and is incident on the image sensor at an oblique angle at an edge of the image sensor. The chief ray angle increases toward the edge of the image sensor, and accordingly, the sensitivity may be reduced at the edge of the image sensor and also the performance of the image sensor may be reduced.

SUMMARY

The present disclosure provides an image sensor including a nano-optical microlens array that may prevent performance degradation caused by inclined chief rays at an edge of the image sensor.

Additional aspects will be set forth in part in the description which follows and, in part, will be apparent from the description, or may be learned by practice of the presented embodiments of the disclosure.

According to an aspect of the disclosure, an image sensor includes: a sensor substrate including a plurality of pixels configured to detect light; and a nano-optical microlens array arranged on the sensor substrate, wherein the nano-optical microlens array includes a plurality of nano-optical microlenses arranged to focus incident light on the plurality of pixels, wherein the plurality of nano-optical microlenses includes a plurality of lens groups, wherein each lens group of the plurality of lens groups includes a first nano-optical microlens, a second nano-optical microlens, a third nano-optical microlens, and a fourth nano-optical microlens each arranged in a 2×2 shape in a first direction and a second direction, wherein each of the first, the second, the third, and the fourth nano-optical microlenses of each lens group of the plurality of lens groups includes a plurality of nanostructures arranged to focus incident light on a corresponding pixel from among the plurality of pixels, wherein the plurality of lens groups are classified into a center group at a center of the nano-optical microlens array and a plurality of peripheral groups spaced apart from the center of the nano-optical microlens array, and wherein a center of each the first, the second, the third, and the fourth nano-optical microlens of each peripheral group of the plurality of peripheral groups is offset with respect to a center of the corresponding pixel, and offset distances of at least two of the first, the second, the third, and the fourth nano-optical microlenses of each peripheral group of the plurality of peripheral groups are different from each other.

For each peripheral group of the plurality of peripheral groups, an offset distance between the center of the second nano-optical microlens and the center of the corresponding pixel may be different from an offset distance between the center of the third nano-optical microlens and the center of the corresponding pixel.

For each peripheral group of the plurality of peripheral groups, among the second nano-optical microlens and the third nano-optical microlens of the respective peripheral group, an offset distance between the center of the nano-optical microlens corresponding to a pixel that detects light of a short wavelength and the center of the corresponding pixel may be less than an offset distance between the center of the other nano-optical microlens and the center of the corresponding pixel.

For each peripheral group of the plurality of peripheral groups, an offset distance between the center of the first nano-optical microlens and the center of the corresponding pixel may be equal to an offset distance between the center of the fourth nano-optical microlens and the center of the corresponding pixel.

For each peripheral group of the plurality of peripheral groups, an offset distance between the center of the first nano-optical microlens and the center of the corresponding pixel and an offset distance between the center of the fourth nano-optical microlens and the center of the corresponding pixel may each be less than an offset distance between the center of a nano-optical microlens, from among the second nano-optical microlens and the third nano-optical microlens of the respective peripheral group, corresponding to a pixel among the plurality of pixels that detects light of a long wavelength and the center of the corresponding pixel.

The first, the second, the third, and the fourth nano-optical microlenses of each lens group of the plurality of lens groups may be arranged to correspond to a pixel arrangement of a Bayer pattern, and for each peripheral group of the plurality of peripheral groups, among the first, the second, the third, and the fourth nano optical microlenses, a first offset distance between the center of the nano-optical microlens corresponding to a pixel among the plurality of pixels that detects blue light and the center of the corresponding pixel may be less than a second offset distance between the center of the nano-optical microlens corresponding to a pixel among the plurality of pixels that detects red light and the center of the corresponding pixel.

A first peripheral group among the plurality of peripheral groups may be located at a position corresponding to a first chief ray angle, a second peripheral group among the plurality of peripheral groups may be located at a position corresponding to a second chief ray angle, and based on the first chief ray angle being greater than the second chief ray angle, a difference between the first offset distance and the second offset distance within the first peripheral group may be greater than a difference between the first offset distance and the second offset distance within the second peripheral group.

Each lens group of the plurality of lens groups may include a plurality of intervals formed between border nanostructures among the plurality of nanostructures of the respective lens group, wherein the border nanostructures may include nanostructures of the respective lens group that are directly facing each other and are separated by a boundary between adjacent nano-optical microlenses from among the first, the second, the third, and the fourth nano-optical microlenses of the respective lens group, and for each lens group of the plurality of lens groups, at least one interval of the plurality of intervals of the center group may be different from at least one interval of the plurality of intervals of a peripheral group of the plurality of peripheral groups.

For each lens group of the plurality of lens groups, the plurality of intervals may include: a first interval defined between the first nano-optical microlens and the second nano-optical microlens; a second interval defined between the first nano-optical microlens and the third nano-optical microlens; a third interval defined between the fourth nano-optical microlens and the third nano-optical microlens; and a fourth interval defined between the fourth nano-optical microlens and the second nano-optical microlens.

The first interval, the second interval, the third interval, and the fourth interval of the center group may be respectively referred to as a first reference interval, a second reference interval, a third reference interval, and a fourth reference interval, and in a peripheral group, from among the plurality of peripheral groups, having an azimuth angle greater than 0 degrees and less than 90 degrees, the first interval may be greater than the first reference interval, the second interval may be greater than the second reference interval, the third interval may be greater than the third reference interval, and the fourth interval may be greater than the fourth reference interval.

A first peripheral group among the plurality of peripheral groups may be located at a position corresponding to a first chief ray angle, a second peripheral group among the plurality of peripheral groups may be located at a position corresponding to a second chief ray angle, and based on the first chief ray angle being greater than the second chief ray angle: a difference between the first interval of the first peripheral group and the first reference interval may be greater than a difference between the first interval of the second peripheral group and the first reference interval, a difference between the second interval of the first peripheral group and the second reference interval may be greater than a difference between the second interval of the second peripheral group and the second reference interval, a difference between the third interval of the first peripheral group and the third reference interval may be greater than a difference between the third interval of the second peripheral group and the third reference interval, and a difference between the fourth interval of the first peripheral group and the fourth reference interval may be greater than a difference between the fourth interval of the second peripheral group and the fourth reference interval.

The first interval, the second interval, the third interval, and the fourth interval of the center group may be respectively referred to as a first reference interval, a second reference interval, a third reference interval, and a fourth reference interval, and in a peripheral group, from among the plurality of peripheral groups, having an azimuth angle greater than 90 degrees and less than 180 degrees, the first interval may be less than the first reference interval, the second interval may be greater than the second reference interval, the third interval may be less than the third reference interval, and the fourth interval may be greater than the fourth reference interval.

The first interval, the second interval, the third interval, and the fourth interval of the center group may be respectively referred to as a first reference interval, a second reference interval, a third reference interval, and a fourth reference interval, and in a peripheral group, from among the plurality of peripheral groups, having an azimuth angle greater than 180 degrees and less than 270 degrees, the first interval may be less than the first reference interval, the second interval may be less than the second reference interval, the third interval may be less than the third reference interval, and the fourth interval may be less than the fourth reference interval.

The first interval, the second interval, the third interval, and the fourth interval of the center group may be respectively referred to as a first reference interval, a second reference interval, a third reference interval, and a fourth reference interval, and in a peripheral group, from among the plurality of peripheral groups, having an azimuth angle greater than 270 degrees and less than 360 degrees, the first interval may be greater than the first reference interval, the second interval may be less than the second reference interval, the third interval may be greater than the third reference interval, and the fourth interval may be less than the fourth reference interval.

Each peripheral group of the plurality of peripheral groups may include a plurality of intervals formed between border nanostructures among the plurality of nanostructures of the respective peripheral group, the border nanostructures may include nanostructures of the respective peripheral group that are directly facing each other and are separated by a boundary between adjacent nano-optical microlenses from among the first, the second, the third, and the fourth nano-optical microlenses of the respective peripheral group, and for each peripheral group of the plurality of peripheral groups, at least one interval of the plurality of intervals may be different from an arrangement period of the plurality of nanostructures of the first, the second, the third, and the fourth nano-optical microlenses of the respective peripheral group.

A first peripheral group among the plurality of peripheral groups may be located at a position corresponding to a first chief ray angle, a second peripheral group among the plurality of peripheral groups may be located at a position corresponding to a second chief ray angle, and based on the first chief ray angle being greater than the second chief ray angle, a difference between the at least one interval of the first peripheral group and the arrangement period of the plurality of nanostructures of the first peripheral group may be greater than a difference between the at least one interval of the second peripheral group and the arrangement period of the plurality of nanostructures of the second peripheral group.

In a first peripheral group, among the plurality of peripheral groups, in a position where an azimuth angle defined on the nano-optical microlens array is greater than 0 degrees and less than 90 degrees, the plurality of intervals may be larger than the arrangement period of the plurality of nanostructures of the first, the second, the third, and the fourth nano-optical microlenses of the first peripheral group.

In a first peripheral group, among the plurality of peripheral groups, in a position where an azimuth angle defined on the nano-optical microlens array is greater than 180 degrees and less than 270 degrees, the plurality of intervals may each be smaller than the arrangement period of the plurality of nanostructures of the first, the second, the third, and the fourth nano-optical microlenses of the first peripheral group.

According to an aspect of the disclosure, an image sensor includes: a sensor substrate including a plurality of pixels configured to detect light; and a nano-optical microlens array arranged on the sensor substrate, wherein the nano-optical microlens array includes a plurality of nano-optical microlenses arranged to focus incident light on the plurality of pixels, wherein the plurality of nano-optical microlenses includes a plurality of lens groups, wherein each lens group of the plurality of lens groups includes a first nano-optical microlens, a second nano-optical microlens, a third nano-optical microlens, and a fourth nano-optical microlens each arranged in a 2×2 shape in a first direction and a second direction, wherein each of the first, the second, the third, and the fourth nano-optical microlenses of each lens group of the plurality of lens groups includes a plurality of nanostructures arranged to focus incident light on a corresponding pixel among the plurality of pixels, wherein the plurality of lens groups are classified into a center group at a center of the nano-optical microlens array and a plurality of peripheral groups spaced apart from the center of the nano-optical microlens array, wherein each lens group of the plurality of lens groups includes a plurality of intervals formed between border nanostructures from among the plurality of nanostructures of the respective lens group, wherein the border nanostructures include nanostructures of the respective lens group that are directly facing each other and are separated by a boundary between adjacent nano-optical microlenses from among the first, the second, the third, and the fourth nano-optical microlenses of the respective lens group, and wherein, for each lens group of the plurality of lens groups, at least one interval of the plurality of intervals of the center group is different from at least one interval of the plurality of intervals of a peripheral group of the plurality of peripheral groups.

According to an aspect of the disclosure, an electronic apparatus includes: a lens assembly including one or more lenses, wherein the lens assembly is configured to form an optical image of an object; an image sensor configured to convert the optical image into an electrical signal; and at least one processor configured to process the electrical signal, wherein the image sensor includes: a sensor substrate including a plurality of pixels configured to detect light; and a nano-optical microlens array arranged on the sensor substrate, wherein the nano-optical microlens array includes a plurality of nano-optical microlenses arranged to focus incident light on the plurality of pixels, wherein the plurality of nano-optical microlenses includes a plurality of lens groups, wherein each lens group of the plurality of lens groups includes a first nano-optical microlens, a second nano-optical microlens, a third nano-optical microlens, and a fourth nano-optical microlens each arranged in a 2×2 shape in a first direction and a second direction, wherein each of the first, the second, the third, and the fourth nano-optical microlenses of each lens group of the plurality of lens groups includes a plurality of nanostructures arranged to focus incident light on a corresponding pixel from among the plurality of pixels, wherein the plurality of lens groups are classified into a center group at a center of the nano-optical microlens array and a plurality of peripheral groups spaced apart from the center of the nano-optical microlens array, and wherein a center of each first, the second, the third, and the fourth nano-optical microlens of each peripheral group of the plurality of peripheral groups is offset with respect to a center of the corresponding pixel, and offset distances of at least two of the first, the second, the third, and the fourth nano-optical microlenses of each peripheral group of the plurality of peripheral groups are different from each other.

According to an aspect of the disclosure, an image sensor includes: a sensor substrate includes a plurality of pixels configured to detect light; and a nano-optical microlens array arranged on the sensor substrate, wherein the nano-optical microlens array includes a plurality of nano-optical microlenses arranged to focus incident light on the plurality of pixels, wherein the plurality of nano-optical microlenses includes: a central group of nano-optical microlenses, wherein the central group is positioned at a center of the nano-optical microlens array; and a peripheral group of nano-optical microlenses, wherein the peripheral group is spaced apart from the center of the nano-optical microlens array, wherein the each of the central group and the peripheral group respectively includes a first nano-optical microlens, a second nano-optical microlens, a third nano-optical microlens, and a fourth nano-optical microlens each arranged in a 2×2 array, wherein a center of each of the first, the second, the third, and the fourth nano-optical microlenses of the peripheral group is offset with respect to a center of a pixel from among the plurality of pixels corresponding to the peripheral group, and wherein an offset distance of at least two of the first, the second, the third, and the fourth nano-optical microlenses of the peripheral group are different from each other.

BRIEF DESCRIPTION OF THE DRAWINGS

The above and other aspects and features of certain embodiments of the disclosure will be more apparent from the following description taken in conjunction with the accompanying drawings, in which:

FIGS. 12, 13, 14, 15A, 15B, 15C, and 16 are plan views illustrating nano-optical microlens arrays that may be provided in pixel arrays of image sensors according to one or more embodiments;

DETAILED DESCRIPTION

Figure 1:
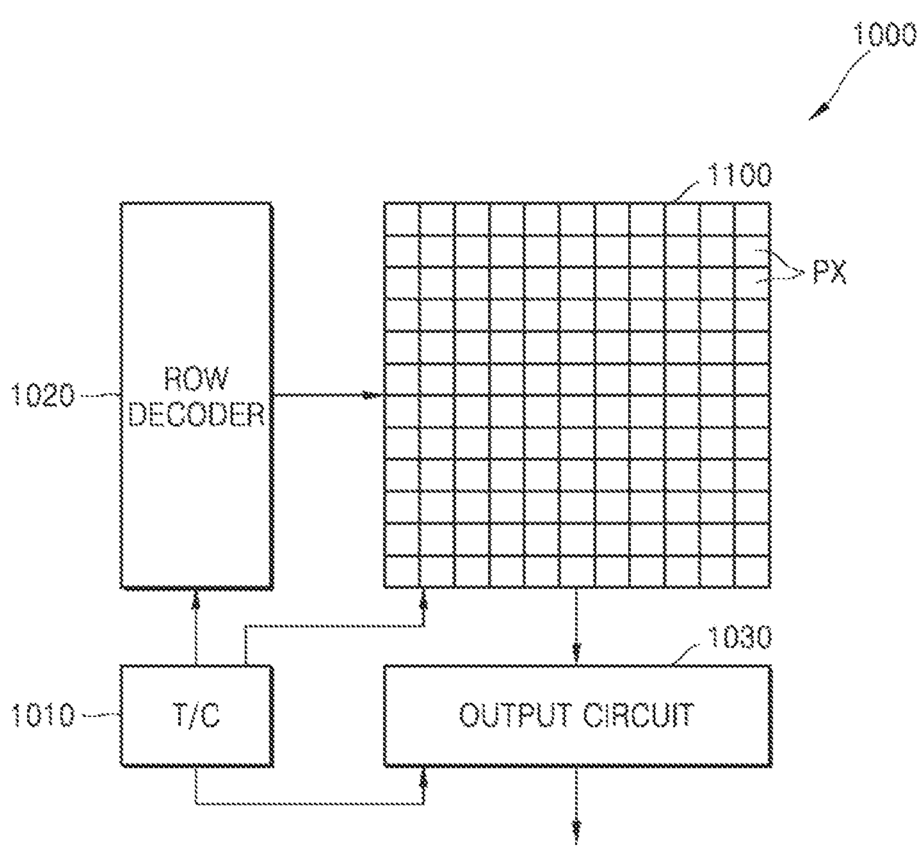
FIG. 1 is a block diagram of an image sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of", when preceding a list of elements, modify the entire list of elements and do not modify the individual elements of the list. As used herein, the expression "at least one of a, b or c" indicates "only a," "only b," "only c," "both a and b," "both a and c," "both b and c," or "all of a, b, and c."

Hereinafter, embodiments are described in detail with reference to the attached drawings. The embodiments to be described below are merely illustrative, and various modifications may be made from the embodiments. In the drawings, like reference numerals refer to like elements, and a size of each element in the drawings may be exaggerated for clarity and convenience of description.

Hereinafter, the term "above", "over", or "on" may include not only what is directly above in contact but also what is above without contact.

The terms "first", "second", and so on may be used to describe various configuration elements but are used only for the purpose of distinguishing one configuration element from another configuration element. The terms do not limit the difference in material or structure of the configuration elements.

A singular expression includes plural expressions unless the context clearly indicates otherwise. In addition, when a part is described to "include" a certain configuration element, which means that the part may further include other configuration elements, except to exclude other configuration elements unless otherwise stated.

Also, terms such as "unit", "portion", and "module" described in the specification may indicate units that process at least one function or operation, which may be configured by hardware, software, or a combination of hardware and software.

Use of a term "above-described" and a similar reference term may correspond to both the singular and the plural.

Steps constituting a method are not limited in the order described and may be performed in any suitable order unless there is a clear statement that the steps should be performed in the order described. Also, use of all example terms ("for example" and "and so on") is merely for describing technical ideas in detail, and the scope of the claims are not limited to the terms unless limited by claims.

FIG. 1 is a block diagram of an image sensor according to an embodiment. Referring to FIG. 1, an image sensor 1000 may include a pixel array 1100, a timing controller 1010, a row decoder 1020, and an output circuit 1030. The image sensor 1000 may be a charge-coupled device (CCD) image sensor or a complementary metal oxide semiconductor (CMOS) image sensor.

The pixel array 1100 includes pixels arranged two-dimensionally in a plurality of rows and a plurality of columns. The row decoder 1020 selects one row of the pixel array 1100 in response to a row address signal output from the timing controller 1010. The output circuit 1030 outputs a light detection signal in column units from a plurality of pixels arranged in the selected row. For example, the output circuit 1030 may include a plurality of ADCs arranged for each column between a column decoder and the pixel array 1100, or one ADC at an output terminal of the column decoder. To this end, the output circuit 1030 may include a column decoder and an analog to digital converter (ADC). The timing controller 1010, the row decoder 1020, and output circuit 1030 may be included in a single semiconductor chip or in separate semiconductor chips. A processor for processing an image signal output from the output circuit 1030 may be included in a single chip along with the timing controller 1010, the row decoder 1020, and the output circuit 1030.

The pixel array 1100 may include a plurality of pixels PX that sense light of different wavelengths. Arrangement of pixels may be implemented in various ways.

Figure 2A:
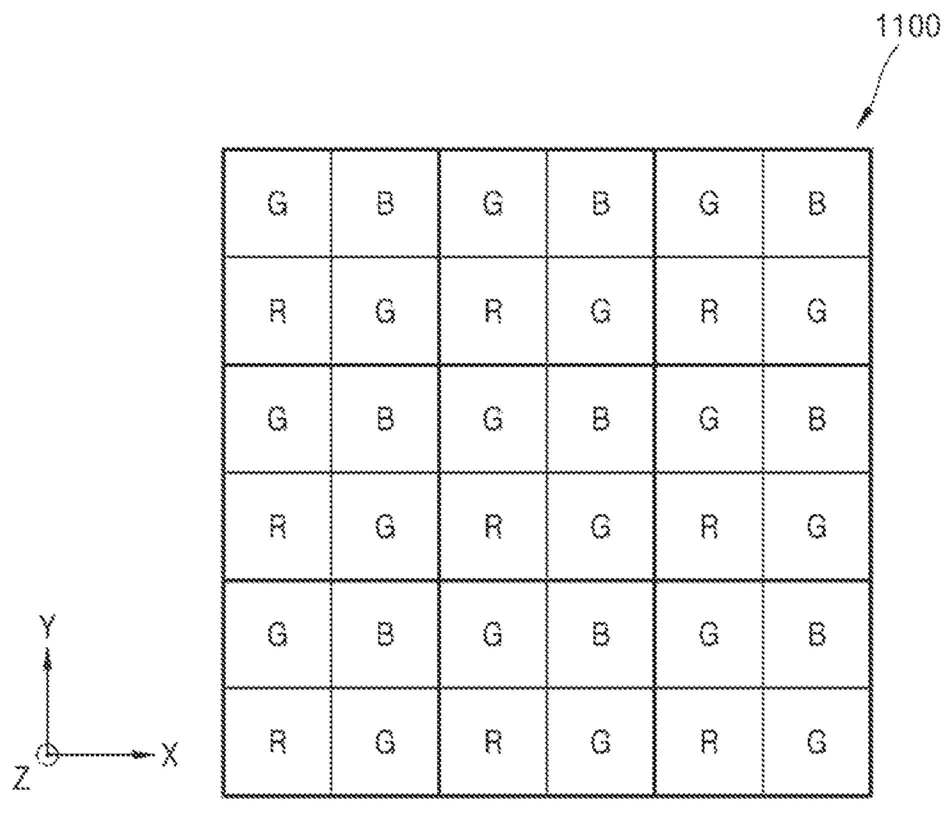
FIG. 2A is a plan view illustrating a color arrangement of a pixel array of an image sensor.
Figure 2B:
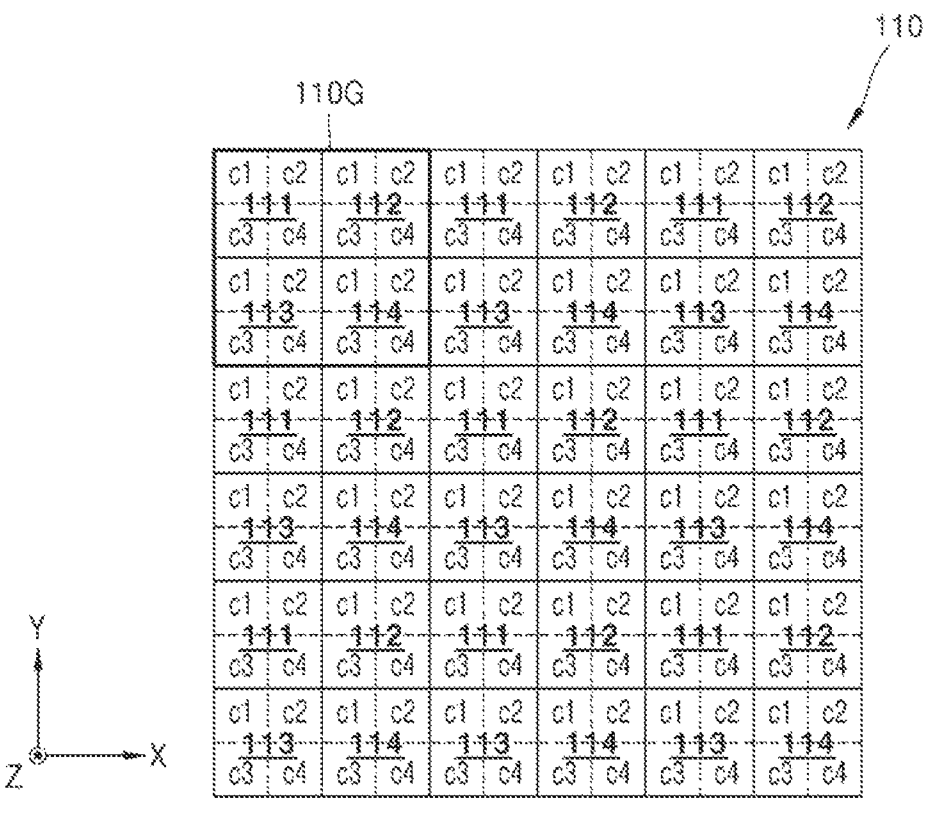
FIGS. 2B, 2C, and 2D respectively schematically illustrate a sensor substrate, a filter layer, and an arrangement of nano-optical microlenses provided in the pixel array of the image sensor according to an embodiment.
Figure 2C:
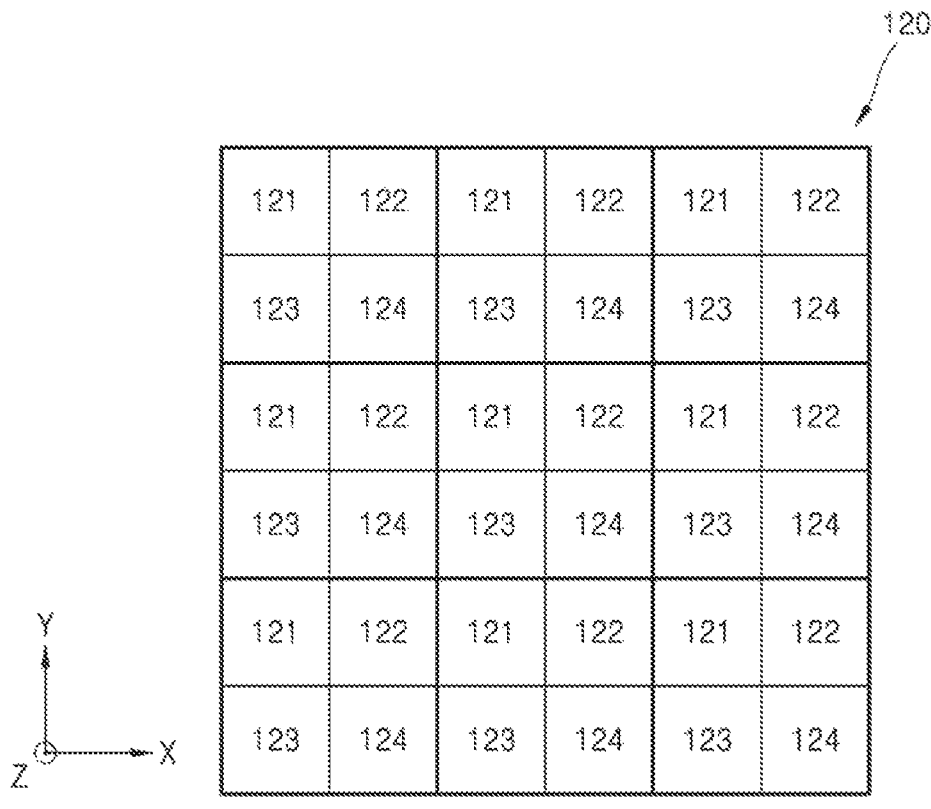
Figure 2D:
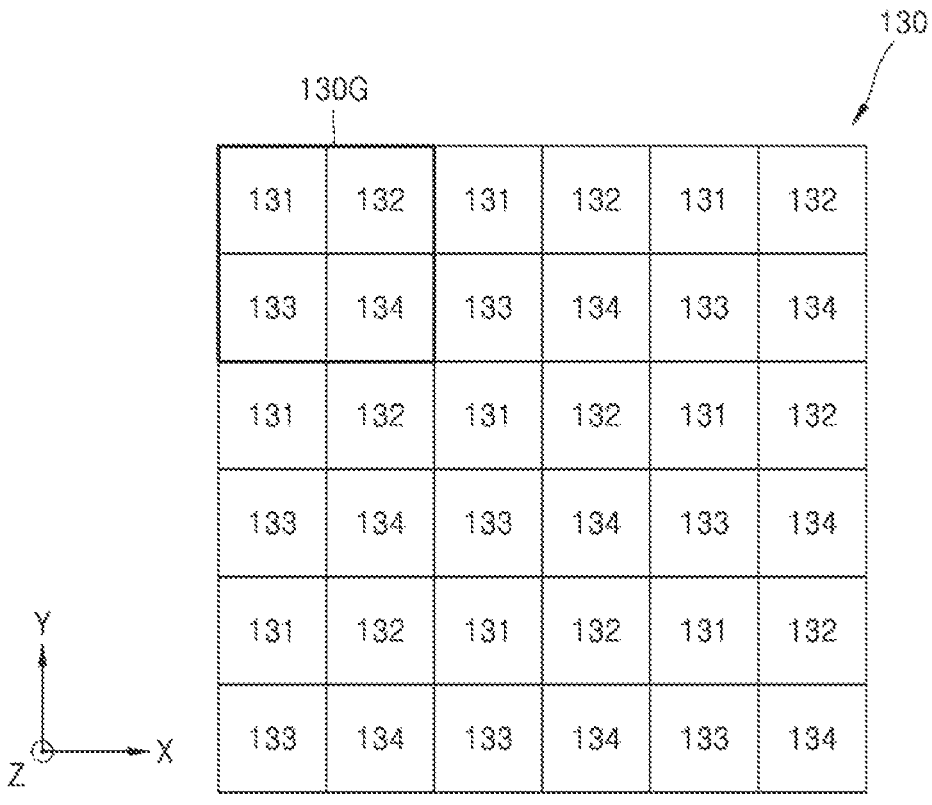

FIG. 2A is a plan view illustrating a color arrangement of a pixel array of an image sensor, and FIGS. 2B, 2C, and 2D respectively schematically illustrate a sensor substrate, a filter layer, and an arrangement of nano-optical microlens provided in the pixel array of the image sensor according to an embodiment.

The color arrangement illustrated in FIG. 2A is a Bayer pattern arrangement used in general image sensors. As illustrated in FIG. 2A, one unit pattern includes four quadrant regions, and the four quadrant regions may each represent green G, blue B, red R, and green G. A plurality of unit patterns are arranged two-dimensionally and repeatedly in a first direction (the X direction) and a second direction (the Y direction). As illustrated in FIG. 2A, in the unit pattern of a 2×2 array, two green pixels may be arranged in one diagonal direction, and one blue pixel and one red pixel may be arranged in the other diagonal direction. In other words, a first row in which a plurality of green pixels and a plurality of blue pixels are alternately arranged in the first direction and a second row in which a plurality of red pixels and a plurality of green pixels are alternately arranged in the first direction are repeatedly arranged in the second direction.

The color arrangement in FIG. 2A is an example and is not limited thereto. For example, a CYGM arrangement in which magenta, cyan, yellow, and green are displayed in one unit pattern, or green, red, blue, and an RGBW arrangement in which green are displayed in one unit pattern may also be used. Also, the unit pattern may be implemented in a 3×2 array, and pixels of the pixel array 1100 may be arranged in various ways depending on color properties of the image sensor 1000. Although the pixel array 1100 of the image sensor 1000 is described below to have a Bayer pattern as an example, an operation principle may be applied to other types of pixel arrays other than the Bayer pattern.

The pixel array 1100 of the image sensor 1000 may have a structure that collects light of a color corresponding to the color arrangement, that is, a certain pixel.

Referring to FIG. 2B, a sensor substrate 110 may include a plurality of pixels that sense incident light. The sensor substrate 110 may include a plurality of unit pixel groups 110G. The unit pixel group 110G may include a first pixel 111, a second pixel 112, a third pixel 113, and a fourth pixel 114 that generate image signals by converting incident light into electrical signals. The unit pixel group 110G may have a pixel arrangement of a Bayer pattern. The pixel arrangement of the sensor substrate 110 is used to sense incident light by dividing the incident light into unit patterns, such as Bayer patterns, as illustrated in FIG. 2A. For example, the first pixel 111 and the fourth pixel 114 may be green pixels that sense green light, the second pixel 112 may be a blue pixel that senses blue light, and the third pixel 113 may be a blue pixel that senses red light. Hereinafter, the pixel arrangement of an image sensor 1000 may be used interchangeably with the pixel arrangement of the sensor substrate 110. Also, hereinafter, the first pixel 111 and the fourth pixel 114 may be respectively used interchangeably with a first green pixel and a second green pixel, the second pixel 112 may be used interchangeably with a blue pixel, and the third pixel 113 may be used interchangeably with a red pixel. However, this is for the sake of convenience of description and is not limited thereto.

Each of the first, second, third, and fourth pixels 111, 112, 113, and 114 may include a plurality of light sensing cells that independently sense incident light. For example, each of the first, second, third, and fourth pixels 111, 112, 113, and 114 may include first, second, third, and fourth light sensing cells c1, c2, c3, and c4. The first, second, third, and fourth light sensing cells c1, c2, c3, and c4 may be two-dimensionally arranged in the first direction (the X direction) and the second direction (the Y direction). For example, the first, second, third, and fourth light sensing cells c1, c2, c3, and c4 in each of the first, second, third, and fourth pixels 111, 112, 113, and 114 may be arranged in a 2×2 array.

Although FIG. 2B illustrates that each of the first, second, third, and fourth pixels 111, 112, 113, and 114 includes four light sensing cells as an example, four or more independent light sensing cells may be clustered and arranged in two-dimension. For example, each of the first, second, third, and fourth pixels 111, 112, 113, and 114 may also include a plurality of independent light sensing cells clustered and arranged in a 3×3 array or a 4×4 array. Hereinafter, a case where each of the first, second, third, and fourth pixels 111, 112, 113, and 114 includes light sensing cells arranged in a 2×2 array is described for the sake of convenience.

According to an embodiment, some of the plurality of pixels including a plurality of light sensing cells that sense light of the same color may be used as autofocus pixels. Each of the autofocus pixels may obtain an autofocus signal from a difference between output signals of adjacent light sensing cells. For example, the autofocus signal in the first direction (the X direction) may be generated from a difference between an output signal of a first light sensing cell c1 and an output signal of a second light sensing cell c2, a difference between an output signal of a third light sensing cell c3 and an output signal of a fourth light sensing cell c4, or a difference between the sum of the output signals of the first light sensing cell c1 and the third light sensing cell c3 and the sum of the output signals of the second light sensing cell c2 and the fourth light sensing cell c4. Also, the autofocus signal in the second direction (the Y direction) may be generated from a difference between the output signal of the first light sensing cell c1 and the output signal of the second light sensing cell c2, a difference between the output signal of the third light sensing cell c3 and the output signal of the fourth light sensing cell c4, or a difference between the sum of the output signals of the first light sensing cell c1 and the second light sensing cell c2 and the sum of the output signals of the third light sensing cell c3 and the fourth light sensing cell c4.

In addition, a general method for obtaining an image signal include a sum mode and a full mode. In the sum mode, an image signal may be obtained by summing output signals of the first, second, third, and fourth light sensing cells c1, c2, c3, and c4. For example, a first green image signal may be generated by summing the output signals of the first, second, third, and fourth light sensing cells c1, c2, c3, and c4 of the first pixel 111, a blue image signal may be generated by summing the output signals of the first, second, third, and fourth light sensing cells c1, c2, c3, and c4 of the second pixel 112, a red image signal may be generated by summing the output signals of the first, second, third, and fourth light sensing cells c1, c2, c3, and c4 of the third pixel 113, and a second green image signal may be generated by summing the output signals of the first, second, third, and fourth light sensing cells c1, c2, c3, and c4 of the fourth pixel 114. In the full mode, each output signal is obtained by using each of the first, second, third, and fourth light sensing cells c1, c2, c3, and c4 as an individual pixel. In this case, high resolution images may be obtained.

Referring to FIG. 2C, the filter layer 120 may include a plurality of color filters that selectively transmit incident light in different wavelength bands therethrough. The plurality of color filters may correspond one-to-one to the plurality of pixels of the sensor substrate 110 illustrated in FIG. 2B. The plurality of color filters may respectively face the plurality of pixels of the sensor substrate 110. For example, the filter layer 120 includes a first color filter 121 facing the first pixel 111, a second color filter 122 facing the second pixel 112, a third color filter 123 facing the third pixel 113, and fourth color filter 124 facing the fourth pixel 114. Like the first, second, third, and fourth pixels 111, 112, 113, and 114, unit groups including the first, second, third, and fourth color filters 121, 122, 123, and 124 may be two-dimensionally arranged in the first direction (the X direction) and the second direction (the Y direction).

The first and fourth color filters 121 and 124 may be green filters that transmit incident light in a green wavelength band therethrough and block, for example, absorb light in the other wavelength bands, the second color filter 122 may be a blue filter that transmits incident light in a blue wavelength band therethrough and block light in the other wavelength bands, and the third color filter 123 may be a red filter that transmits incident light in a red wavelength band therethrough and block light in the other wavelength bands. The first, second, third, and fourth color filters 121, 122, 123, and 124 may be organic color filters including organic dyes or organic pigments.

Referring to FIG. 2D, the nano-optical microlens array 130 may include a plurality of nano-optical microlenses 131, 132, 133, and 134. The nano-optical microlens array 130 may include a plurality of lens groups 130G, and each of the plurality of lens groups 130G may include first, second, third, and fourth nano-optical microlenses 131, 132, 133, and 134. The nano-optical microlens array 130 may be on the filter layer 120 illustrated in FIG. 2C, the first, second, third, and fourth nano-optical microlenses 131, 132, 133, and 134 may correspond one-to-one to the first, second, third, and fourth color filters 121, 122, 123, and 124 and may also correspond one-to-one to the first, second, third, and fourth pixels 111, 112, 113, and 114. For example, the nano-optical microlens array 130 may include the first nano-optical microlens 131 on the first color filter 121, the second nano-optical microlens 132 on the second color filter 122, the third nano-optical microlens 133 on the third color filter 123, and the fourth nano-optical microlens 134 on the fourth color filter 124. The first nano-optical microlens 131 and the second nano-optical microlens 132 may be alternately arranged in the first direction (the X direction), and in a cross-section where a position of the second direction (Y direction) is different from a position of the first direction, the third nano-optical microlens 133 and the fourth nano-optical microlens 134 may be alternately arranged in the first direction (the X direction).

The first, second, third, and fourth nano-optical microlenses 131, 132, 133, and 134 may be two-dimensionally arranged in the first and second directions to each face a corresponding color filter and a corresponding pixel. For example, the first pixel 111, the first color filter 121, and the first nano-optical microlens 131 may face each other in a third direction (the Z direction) perpendicular to the first and second directions. Also, the second pixel 112, the second color filter 122, and the second nano-optical microlens 132 may face each other in the third direction, the third pixel 113, the third color filter 123, and the third nano-optical microlenses 133 may face each other in the third direction, and the fourth pixel 114, the fourth color filter 124, and the fourth nano-optical microlens 134 may face each other in the third direction.

The first, second, third, and fourth nano-optical microlenses 131, 132, 133, and 134 may respectively focus light on corresponding pixels among the first, second, third, and fourth pixels 111, 112, 113, and 114. For example, the first nano-optical microlens 131 may focus incident light on the first pixel 111, the second nano-optical microlens 132 may focus incident light on the second pixel 112, the third nano-optical microlens 133 may focus incident light on the third pixel 113, and the fourth nano-optical microlens 134 may focus incident light on the fourth pixel 114. Among the focused incident light, green light may pass through the first and fourth color filters 121 and 124 to be focused on the first and fourth pixels 111 and 114, blue light may pass through the second color filter 122 to be focused on the second pixel 112, and the red light may pass through the third color filter 123 to be focused on the third pixel 113.

To this end, each of the first, second, third, and fourth nano-optical microlenses 131, 132, 133, and 134 may each have a nano-pattern structure capable of focusing light. The nano-pattern structure may include a plurality of nanostructures (not illustrated) that change the phase of incident light depending on incident positions. Shapes, sizes (widths and heights), intervals, an arrangement form, and so on of the plurality of nanostructures may be determined such that lights immediately after respectively passing through the first, second, third, and fourth nano-optical microlenses 131, 132, 133, and 134 have preset phase profiles. According to the phase profiles, directions and focal distances of the lights respectively passing through the first, second, third, and fourth nano-optical microlenses 131, 132, 133, and 134 may be determined. In other words, detailed shapes and an arrangement of nanostructures respectively included in the first, second, third, and fourth nano-optical microlenses 131, 132, 133, and 134 may be adjusted to suit the phase profiles. Also, the detailed shapes and an arrangement of the nanostructures may be adjusted according to relative positions of the nanostructures in the nano-optical microlens array 130 of the lens group 130G including the nanostructures. This is described below in detail with reference to FIGS. 3 to 9D.

Figure 3:
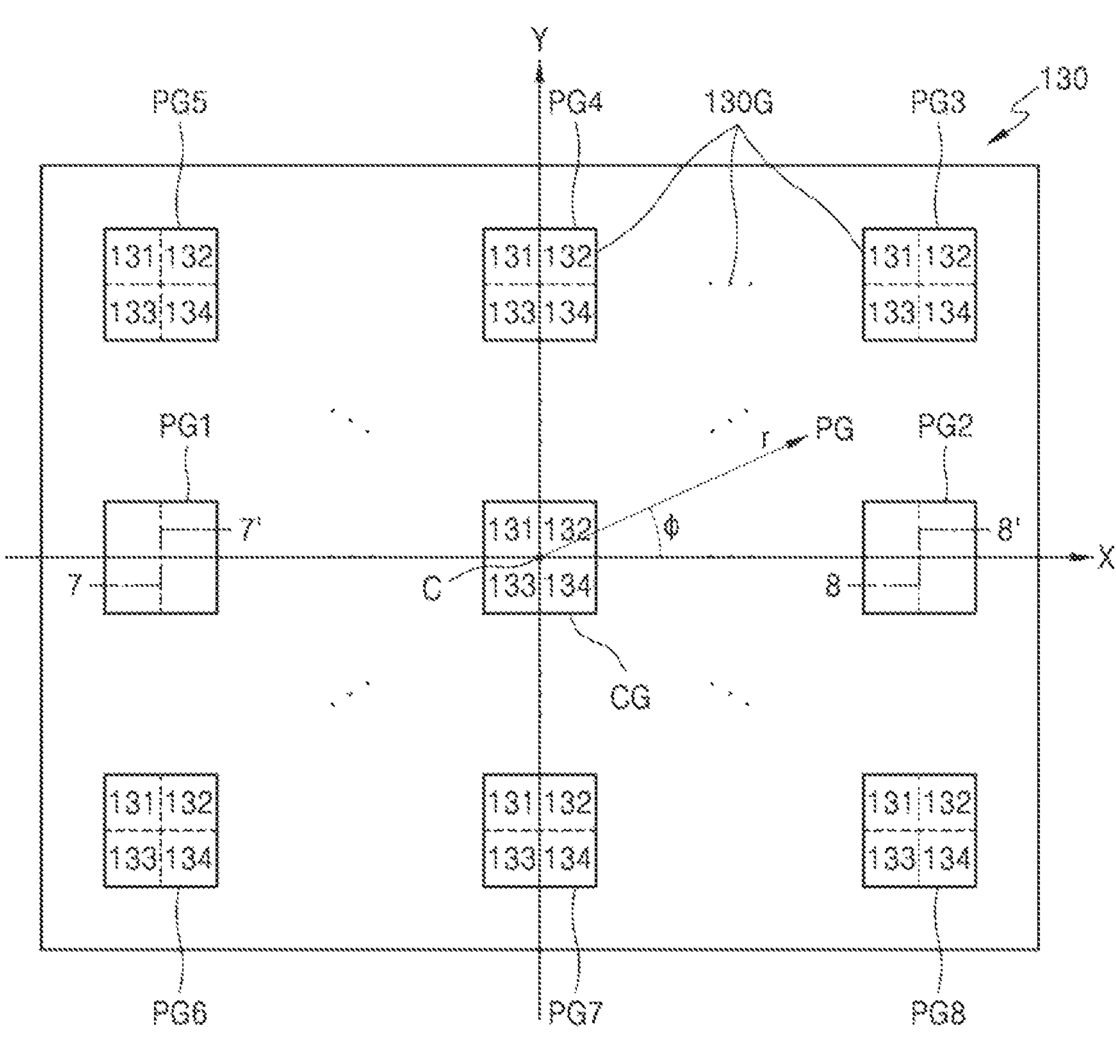
FIG. 3 is a plan view illustrating a plurality of lens groups included in a nano-optical microlens array in a pixel array of an image sensor according to an embodiment and defined as a center group and peripheral groups according to positions thereof and illustrating azimuth angle directions.

FIG. 3 is a plan view illustrating a plurality of lens groups that are included in a nano-optical microlens array in a pixel array of an image sensor according to an embodiment and deformed as a center group and peripheral groups according to positions thereof and illustrating azimuth angle directions Referring to FIG. 3, the lens groups 130G included in the nano-optical microlens array 130 are two-dimensionally arranged in a first direction (the X direction) and a second direction (the Y direction). The lens groups 130G may be defined as a center group CG and peripheral groups PG according to positions of the lens groups 130G. The center group CG is at a central portion of the nano-optical microlens array 130, and the peripheral groups PG are groups spaced apart from the central portion, that is, lens groups other than the center group CG. Although FIG. 3 illustrates that the center group CG is a single group, a plurality of lens groups 130G at a central portion may be defined as the center groups CG for the sake of convenience of design.

A position of each of the peripheral groups PG may be represented by a distance r and an azimuth angle ¢ from a center C of the nano-optical microlens array 130. The azimuth angle ¢ may be defined based on an axis (the X-axis) that passes through the center C of the nano-optical microlens array 130 and is parallel to the first direction. FIG. 3 illustrates a peripheral group PG1 on an edge side having an azimuth angle of 180 degrees, that is, in a left peripheral portion, a peripheral group PG2 on an edge side having an azimuth angle of 0 degrees, that is, in a right peripheral portion, peripheral groups PG3, PG4, PG5, PG6, PG7, and PG8 in peripheral portions having various azimuth angles. Line 7-7' and line 8-8' respectively indicated in the peripheral group PG1 and the peripheral group PG2 are directions of cross-sectional views of FIGS. 7A and 8A described below.

r, which is one of parameters defining positions of the peripheral groups PG, is related to a chief ray angle. At a position where r is 0, that is, at the center C of the nano-optical microlens array 130, a chief ray angle is 0, and as r increases, the chief ray angle increases.

Figure 4:
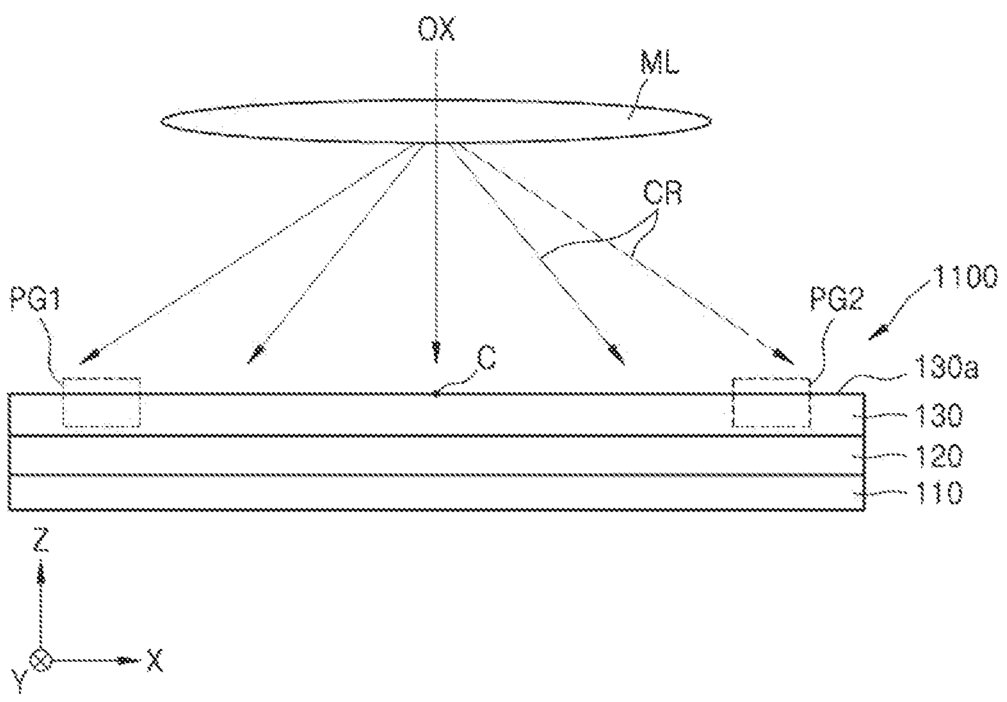
FIG. 4 is a conceptual diagram illustrating an angle of a chief ray incident on a pixel array of an image sensor according to an embodiment.

FIG. 4 is a conceptual diagram illustrating a chief ray angle incident on a pixel array of an image sensor according to an embodiment.

A pixel array 1100 of an image sensor may be employed in a camera module together with a module lens ML, and light directed to the pixel array 1100 through the module lens ML may be incident on the pixel array 1100 in different incident angles depending on a position of the pixel array 1100. The incident angle of light incident on the pixel array 1100 is defined in general as a chief ray angel (CRA). A chief ray CR refers to a ray that starts from a point of an object, passes through the center of the module lens ML, and is incident on the pixel array 1100, and the chief ray angle is defined as an angle between the chief ray CR and an optical axis OX, that is, an angle formed with a normal line of a light incident surface 130*a* of the nano-optical microlens array 130.

The chief ray angle of the light incident on the center C of the nano-optical microlens array 130 is 0 degrees, and the chief ray angle of the incident light increases toward an edge of the nano-optical microlens array 130. Also, a direction of the main ray changes depending on azimuth angles of the edge. For example, in the nano-optical microlens array 130, a chief ray angle of the chief ray incident on the peripheral group PG1 in the left peripheral portion is equal to a chief ray angle of chief ray incident on the peripheral group PG2 in the right peripheral portion, and incident directions of the chief rays are symmetrical to the normal line of the light incident surface.

In the pixel array 1100 of the image sensor according to the embodiment, detailed shapes and an arrangement of nanostructures constituting the nano-optical microlens array 130 are set by considering the chief ray angles and directions of the chief ray.

The nano-optical microlens array 130 operates efficiently for light incident within a preset angle range, but when the incident angle is away from the preset angle range, the light focusing performance of the nano-optical microlens array 130 may be reduced. Accordingly, for example, when the first, second, third, and fourth nano-optical microlenses 131, 132, 133, and 134 are designed to be identical in the entire region of the image sensor 1000, light focusing efficiency may change depending on regions of the image sensor 1000, and the quality of an image provided by the image sensor 1000 may be reduced, for example, there may be a signal difference between a plurality of light sensing cells corresponding to the same pixel.

As described above, the first, second, third, and fourth pixels 111, 112, 113, and 114 may each include a plurality of light sensing cells, and there may be a signal difference between the plurality of light sensing cells corresponding to the same pixel, which is called a channel difference. The channel difference may occur due to a structural deviation in a process and may also occur due to a chief ray angle. Also, because lights of different wavelengths have different focal lengths from each other, the channel difference due to the chief ray angle may change depending on wavelengths of light. The channel difference may reduce the quality of an image obtained by the image sensor 1000. The channel difference may also cause an error when an autofocus signal is generated. As described with reference to FIG. 2B, when the first, second, third, and fourth pixels 111, 112, 113, and 114 each include the first, second, third, and fourth light sensing cells c1, c2, c3, and c4, for example, an autofocus signal may be obtained by using a difference between the sum of output signals of the first light sensing cell c1 and the third light sensing cell c3 and the sum of output signals of the second light sensing cell c2 and the fourth light sensing cell c4. When a difference value is 0, it can be determined that the image sensor 1000 is well located on a focal plane of a module lens of an imaging device including the image sensor 1000. When the difference value is not 0, the module lens may be moved such that the image sensor 1000 is located on the focal plane of the module lens according to the difference value and a sign of the difference value. However, when there is the channel difference, autofocus signals may not be symmetrical to each other with respect to 0 degrees, and accuracy of the autofocus signals may be reduced. Accordingly, it is necessary to generate an autofocus signal by considering a channel difference, and an operation of the autofocus signal may be complicated.

In the image sensor 1000 according to the embodiment, the first, second, third, and fourth nano-optical microlenses 131, 132, 133, and 134 of the nano-optical microlens array 130 may be designed by considering a chief ray angle of incident light that changes depending on positions where the light is incident on the pixel array 1100 of the image sensor 1000. For example, the arrangement of nanostructures provided in each of the first, second, third, and fourth nano-optical microlenses 131, 132, 133, and 134 of the nano-optical microlens array 130 may be set differently depending on relative positional relationships based on the center of the nano-optical microlens array 130 and the colors of corresponding pixels.

Figure 5A:
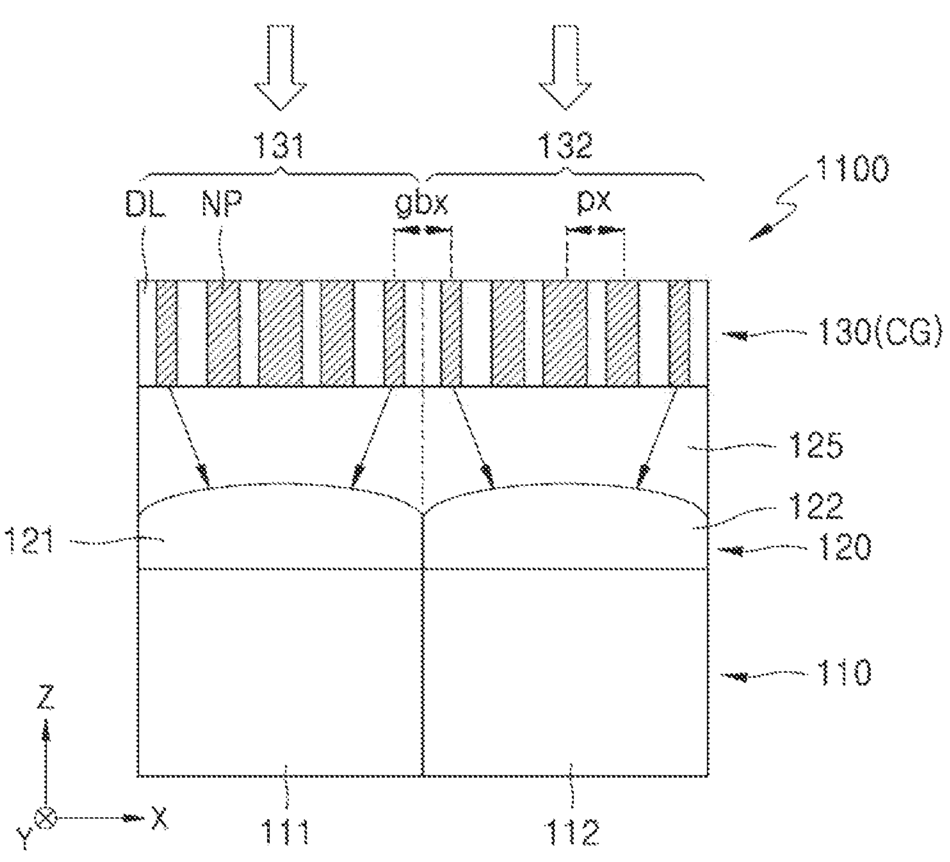
FIGS. 5A and 5B are cross-sectional views schematically illustrating cross-sections of a central portion of a pixel array of an image sensor according to an embodiment.
Figure 5B:
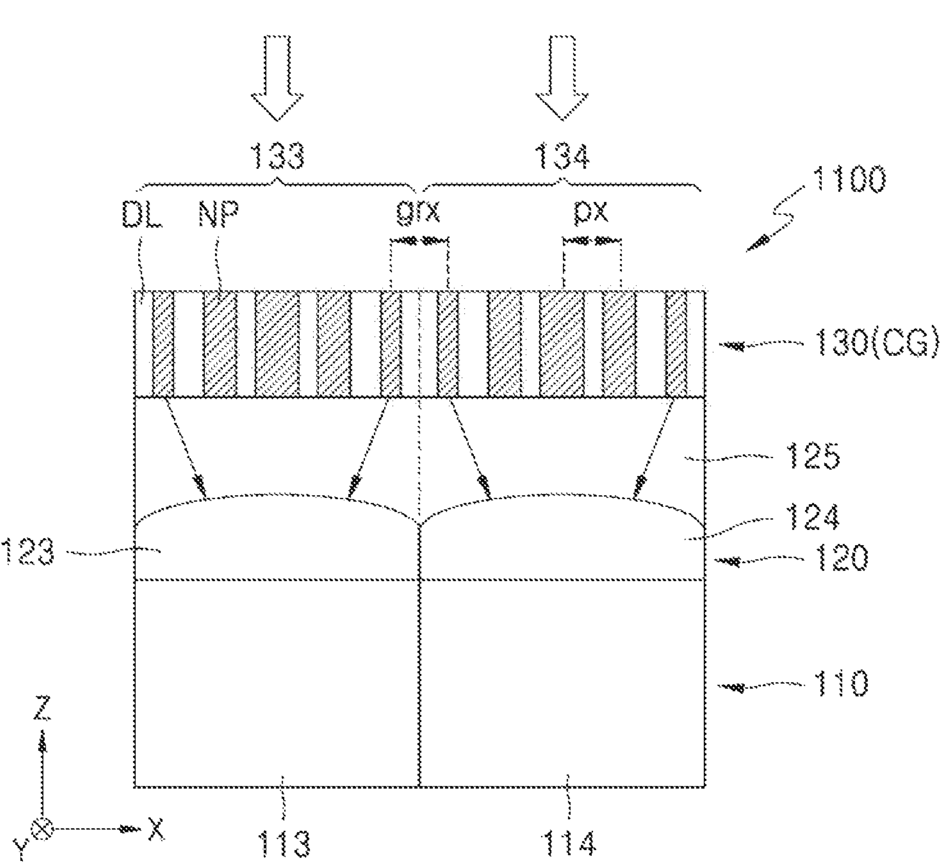
Figure 6:
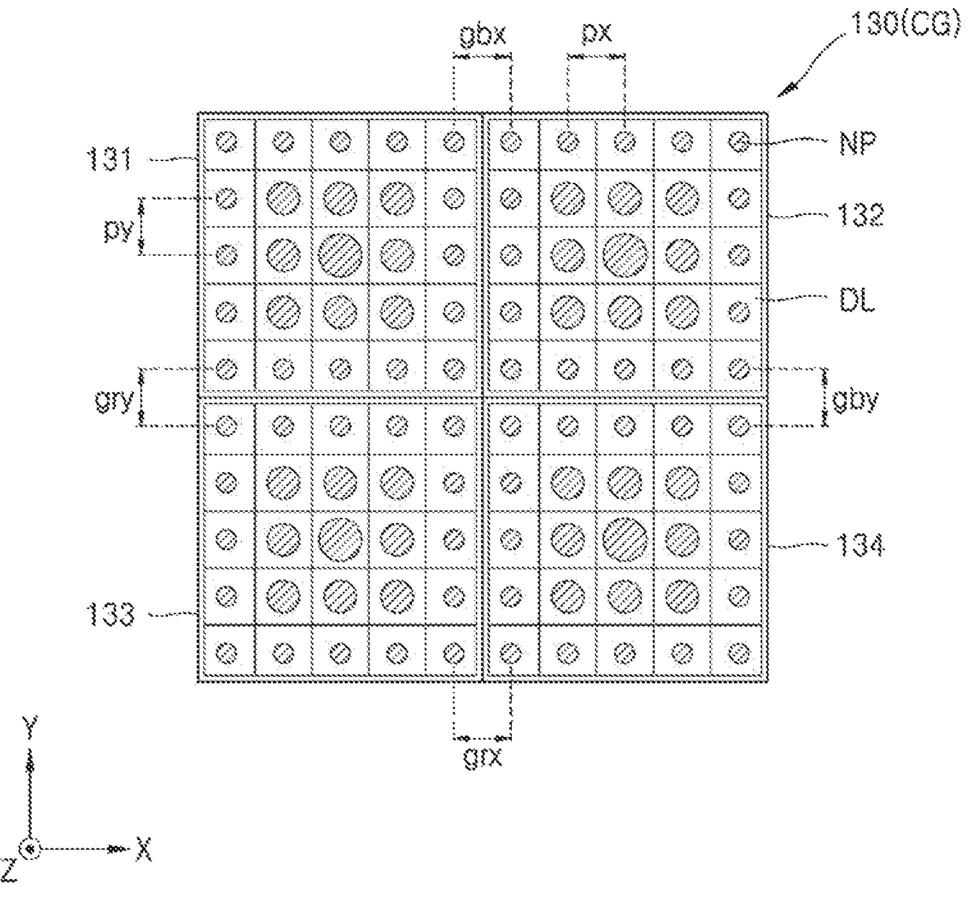
FIG. 6 is a plan view schematically illustrating a center group of a nano-optical microlens array provided in a pixel array of an image sensor according to an embodiment.

FIGS. 5A and 5B are cross-sectional views schematically illustrating cross-sections of a central portion of the pixel array of the image sensor according to the embodiment, and FIG. 6 is a plan view schematically illustrating a center group of a nano-optical microlens array provided in the pixel array of the image sensor according to the embodiment.

A pixel array 1100 includes a sensor substrate 110, a nano-optical microlens array 130 over the sensor substrate 110. A filter layer 120 may be further provided between the sensor substrate 110 and the nano-optical microlens array 130. First, second, third, and fourth pixels 111, 112, 113, and 114 of the sensor substrate 110, first, second, third, and fourth color filters 121, 122, 123, and 124 of the filter layer 120, first, second, third, and fourth nano-optical microlenses 131, 132, 133, and 134 of the nano optical micro lens array 130 may have a corresponding relationship as described with reference to FIGS. 2A to 2D.

The filter layer 120 may further include a planarization layer 125 on the first, second, third, and fourth color filters 121, 122, 123, and 124. The respective upper surfaces of the first, second, third, and fourth color filters 121, 122, 123, and 124 may not be flat. Also, thicknesses of the first, second, third, and fourth color filters 121, 122, 123, and 124 may not be equal to thicknesses of black matrices therebetween. The planarization layer 125 may provide a flat surface for forming the nano-optical microlens array 130 on the filter layer 120. The planarization layer 125 may include an organic polymer material that is suitable for being formed on the first, second, third, and fourth color filters 121, 122, 123, and 124 formed of an organic material and easily forms a flat surface. The organic polymer material forming the planarization layer 125 may have transparent properties to visible light. For example, the planarization layer 125 may include at least one organic polymer material selected from epoxy resin, polyimide, polycarbonate, polyacrylate, and polymethyl methacrylate (PMMA). The material included in the planarization layer 125 is an example, and in some cases, for example, when the first, second, third, and fourth color filters 121, 122, 123, and 124 have equal thickness to each other and each have a flat upper surface, the planarization layer 125 may also be omitted.

The first, second, third, and fourth nano-optical microlenses 131, 132, 133, and 134 may each include a plurality of nanostructures NP. The plurality of nanostructures NP may each be a nanopillar having a cross-sectional diameter of a sub-wavelength. Here, the sub-wavelength refers to a wavelength less than a wavelength band of the light being focused. When the incident light is visible light, the cross-sectional diameter of each of the plurality of nanostructures NP may have a dimension less than, for example, 400 nm, 300 nm, 200 nm, or 100 nm. In addition, a height of each of the plurality of nanostructures NP may be 500 nm to 1500 nm and may be larger than a diameter of a cross-section of each of the plurality of nanostructures NP. That is, an aspect ratio of each of the plurality of nanostructures NP may be greater than 1 or greater than or equal to 2, 3, or 5.

The plurality of nanostructures NP may each be formed of a material that has a relatively higher refractive index than surrounding materials and a relatively low absorption rate in a visible light band. For example, the plurality of nanostructures NP may each include c-Si, p-Si, a-Si, a III-V compound semiconductor (GaP, GaN, GaAs, or so on), SiC, $TiO_2$, $SiN_3$, ZnS, ZnSe, $Si_3N_4$, and/or a combination thereof. Regions around the plurality of nanostructures NP may each be filled with a dielectric material DL that has a relatively lower refractive index than that of the plurality of nanostructures NP and has a relatively low absorption rate in the visible light band. For example, regions around the plurality of nanostructures NP may be filled with siloxane-based spin on glass (SOG), $SiO_2$, $Al_2O_3$, air, or so on.

A high refractive index of each of the plurality of nanostructures NP may be about 2.0 or more with respect to the light of a wavelength of about 630 nm, and a low refractive index of the dielectric material DL may be about 1.0 or more and less than 2.0 with respect to the light of a wavelength of about 630 nm. Also, a difference between the refractive index of each of the plurality of nanostructures NP and the refractive index of the dielectric material DL may be about 0.5 or more. The plurality of nanostructures NP having a difference in refractive index from surrounding materials may change a phase of light passing through the plurality of nanostructures NP. This is due to phase delay caused by a shape dimension of a sub-wavelength of each of the plurality of nanostructures NP, and the phase delay may be determined by detailed shape dimensions and an arrangement of the plurality of nanostructures NP.

The plurality of nanostructures NP included in each of the first, second, third, and fourth nano-optical microlenses 131, 132, 133, and 134 included in the center group CG may have shapes and an arrangement that form phase profiles each having a convex center. That is, the plurality of nanostructures NP included in each of the first, second, third, and fourth nano-optical microlenses 131, 132, 133, and 134 may have shapes and an arrangement that focus incident light having a chief ray angle of 0 degrees on each of the corresponding first, second, third, and fourth pixels 111, 112, 113, and 114 and are similar to shapes and an arrangement of convex lenses. In the center group (G, a shape distribution of the plurality of nanostructures NP of each of the first, second, third, and fourth nano-optical microlenses 131, 132, 133, and 134 may be determined such that a position where the greatest phase delay occurs inside each of the first, second, third, and fourth nano-optical microlenses 131, 132, 133, and 134 is at the center thereof.

The first, second, third, and fourth nano-optical microlenses 131, 132, 133, and 134 each have a flat light incident surface, and accordingly, the first, second, third, and fourth nano-optical microlenses 131, 132, 133, and 134 may each be called a flat nano-optical microlens, compared to a general focusing lens having a curved light incident surface.

As illustrated in FIGS. 5A and 5B, the first, second, third, and fourth nano-optical microlenses 131, 132, 133, and 134 constituting the center group CG may have centers aligned with the centers of the corresponding first, second, third, and fourth pixels 111, 112, 113, and 114. The first, second, third, and fourth color filters 121, 122, 123, and 124 may also have centers aligned with the centers of the corresponding first, second, third, and fourth pixels 111, 112, 113, and 114.

Referring to FIG. 6, the plurality of nanostructures NP included in each of the first, second, third, and fourth nano-optical microlenses 131, 132, 133, and 134 may have a periodic arrangement shape, and cross-sectional sizes thereof decrease toward the peripheral portions from the centers. An arrangement period in a first direction (the X direction) may be px, and an arrangement period in a second direction (the Y direction) may be py. The arrangement period refers to a distance between the centers of two directly adjacent nanostructures NP. The arrangement periods px and py may be equal to each other, but are not limited thereto. The arrangement periods px and py defined within each of the first, second, third, and fourth nano-optical microlenses 131, 132, 133, and 134 may be different from each other in the first, second, third, and fourth nano-optical microlenses 131, 132, 133, and 134. Although a size distribution of the plurality of nanostructures NP in each of the first, second, third, and fourth nano-optical microlenses 131, 132, 133, and 134 is illustrated similarly, this is an example, and the present disclosure is not limited thereto. For example, widths (diameters) of the plurality of nanostructures NP at the center of each of the first, second, third, and fourth nano-optical microlenses 131, 132, 133, and 134 may be different from each other.

In FIG. 6, intervals between two nanostructures directly facing each other with a boundary between the adjacent nano-optical microlenses (i.e., border nanostructures) in a first direction (the X direction) or a second direction (the Y direction) among the first, second, third, and fourth nano-optical microlenses 131, 132, 133, and 134, therebetween, are denoted as gbx, gry, grx, and gby. Here, the intervals are defined as distances between the centers of the nanostructures.

A first interval is an interval between two nanostructures directly facing each other with a boundary between the first nano-optical microlens 131 and the second nano-optical microlens 132 therebetween and is denoted as gbx. The first interval gbx may be equal to the arrangement period px in the center group CG.

A second interval is an interval between two nanostructures directly facing each other with a boundary between the first nano-optical microlens 131 and the third nano-optical microlens 133 and therebetween is denoted as gry. The second interval gry may be equal to the arrangement period py in the center group CG.

A third interval is an interval between two nanostructures directory facing each other with a boundary between the fourth nano-optical microlens 134 and the third nano-optical microlens 133 therebetween and is denoted as grx. The third interval grx may be equal to the arrangement period px in the center group CG.

A fourth interval is an interval between two nanostructures directly facing each other with a boundary between the fourth nano-optical microlens 134 and the second nano-optical microlens 132 therebetween and is denoted as gby. The fourth interval gby may be equal to the arrangement period py in the center group CG.

In the pixel array 1100 of the image sensor according to the embodiment, unlike the center group CG on which light is incident with a chief ray angle of 0 degrees or nearly 0 degrees, at least one of the four intervals described above in the peripheral groups PG where a chief ray angle is greater than 0 degrees may be different from arrangement periods of the plurality of nanostructures NP in the adjacent nano-optical microlens. For example, the first and third intervals gbx or grx may be greater or less than the arrangement period px, and the second and fourth intervals gby or gry may be greater or less than the arrangement period py.

As described above, different relative positional relationships between the plurality of nanostructures NP of the first, second, third, and fourth nano-optical microlenses 131, 132, 133, and 134 in the peripheral groups PG reduce a channel difference and are described in detail below.

Figure 7A:
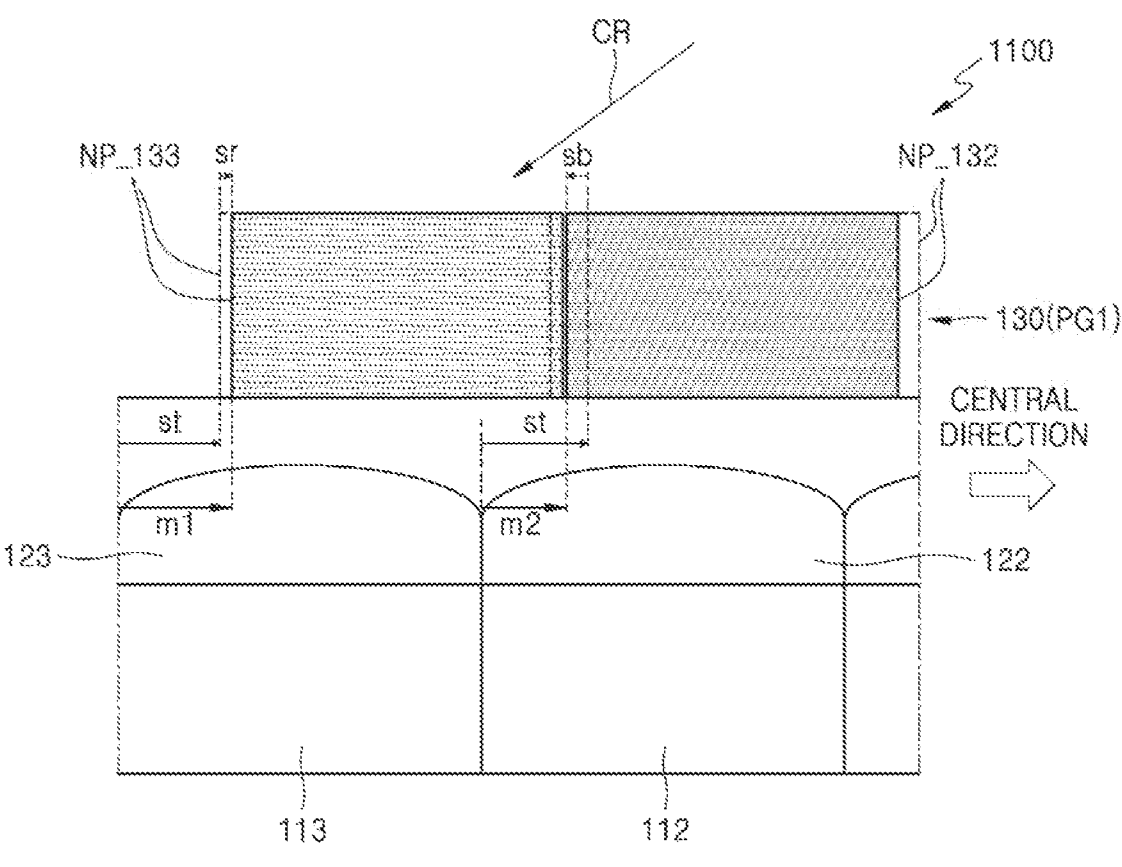
FIG. 7A is a cross-sectional view conceptually illustrating the establishment of a relative positional relationship between nanostructures forming a left peripheral group of a nano-optical microlens array in a pixel array of an image sensor according to an embodiment.

FIG. 7A is a cross-sectional view conceptually illustrating establishment of a relative positional relationship between nanostructures included in a left peripheral group of the nano-optical microlens array 130 in a pixel array of an image sensor according to an embodiment.

The peripheral group PG1 included in the pixel array 1100 shows a relative positional relationship illustrated in FIGS.

3 and 4 and is on a left edge, that is, at an azimuth angle of 180 degrees, and the pixel array 1100 shows a cross-sectional view taken along line 7-7' of the peripheral group PG1 illustrated in FIG. 3. Nanostructures in the peripheral group PG1 are not illustrated for the sake of convenience, and all nanostructures included in the third nano-optical microlens 133 are denoted as NP_133, and all nanostructures included in the second nano-optical microlens 132 are denoted as NP_132.

As illustrated, at this position, the center of an arrangement of all the nanostructures NP_133 included in the third nano-optical micro lens 133 is not aligned with the center of the third pixel 113 and is offset by a preset interval. This interval is referred to as a first offset interval m1. Hereinafter, the center of the third nano-optical microlens 133 refers to the center of an arrangement of all the nanostructures NP_133 included in the third nano-optical microlens 133. Likewise, the expression a "center" of each of the first, second, third, and fourth nano-optical microlenses 131, 132, 133, and 134 refers to the center of an arrangement of all the nanostructures included in each of the first, second, third, and fourth nano-optical microlenses 131, 132, 133, and 134.

Also, the center of the second nano-optical microlens 132 is not aligned with the center of the corresponding second pixel 112 and is offset by a preset interval. This interval is referred to as a second offset interval m2.

The first offset interval m1 and the second offset interval m2 may be set through the following design process.

First, all the nanostructures NP_133 included in the third nano-optical microlens 133 and all the nanostructures NP_132 included in the second nano-optical microlens 132 are moved in a central direction by an interval st. In this case, nanostructures included in the first nano-optical microlens 131 and the fourth nano-optical microlens 134, which not illustrated in FIG. 7A, are also moved in the central direction by the interval st. This movement is for all nanostructures included in the first, second, third, and fourth nano-optical microlenses 131, 132, 133, and 134, and may be referred to as a main shift. In the peripheral group PG1, the interval st is greater than 0. The interval st increases as a chief ray angle increases, and for example, the interval st may increase in a peripheral group having a greater chief ray angle than the illustrated peripheral group PG1. The interval st may be approximately within 1/10 of a channel pitch. Here, the channel pitch refers to a width of one light sensing cell among a plurality of light sensing cells included in one pixel. When the channel pitch is 0.5 μm, the interval st may be about 500 nm or less. In other words, the interval st may be about 500 nm at a position where the chief ray angle is the greatest. However, this is an example, and the present disclosure is not limited thereto.

Next, all the nanostructures NP_133 included in the third nano-optical microlens 133 are further moved in the central direction by an interval sr. All the nanostructures NP_132 included in the second nano-optical microlens 132 are moved by an interval sb in a direction opposite to the central direction. This movement may be referred to as an individual microshift in distinction from a main shift described above. A movement distance indicated by sr or sb is less than the interval st by the main shift, for example, may be about 1/5 to 1/10 of the interval st. However, this is an example, and the present disclosure is not limited thereto.

The intervals sr and sb may increase as the chief ray angle increases. That is, the intervals sr and sb of different values may be applied to peripheral groups having chief ray angles different from the illustrated peripheral group PG1, that is, peripheral groups having different distances from the center of the nano-optical microlens array 130.

According to the design process, the first offset interval m1 is st+sr, and the second offset interval m2 is st−sb. Directions of the first offset interval m1 and the second offset interval m2 are the same as the central direction. In the peripheral group PG1, sr and sb are greater than 0, that is, st+sr is different from st−sb. In other words, in the peripheral group PG1, the centers of the first, second, third, and fourth nano-optical microlenses 131, 132, 133, and 134 are offset with respect to the centers of the corresponding first, second, third, and fourth pixels 111, 112, 113, and 114, and the offset distances may be different from each other in at least two of the first, second, third, and fourth nano-optical microlenses 131, 132, 133, and 134. Also, st+sr is greater than st−sb. In other words, an interval by which the center of a nano-optical microlens corresponding to a pixel for sensing light in the longest wavelength band among the first, second, third, and fourth nano-optical microlenses 131, 132, 133, and 134 is offset with respect to the center of a corresponding pixel may be greater than an interval by which the center of a nano-optical microlens corresponding to a pixel for sensing light in the shortest wavelength band is offset with respect to the center of a corresponding pixel. For example, a distance by which the center of the third nano-optical microlens 133 corresponding to the third pixel 113 for sensing red light is offset with respect to the center of the third pixel 113 may be greater than a distance by which the center of the second nano-optical microlens 132 corresponding to the second pixel 112 for sensing blue light is offset with respect to the center of the second pixel 112.

Also, |m1−m2|, which is a difference between the first offset interval m1 and st+sr and the second offset interval m2 and st−sb, that is, sr+sb may increase as a chief ray angle increases. That is, a difference between the first offset interval m1 and the second offset interval m2 may increase in a peripheral group having a greater chief ray angle than the illustrated peripheral group PG1, and the difference between the first offset interval m1 and the second offset interval m2 may decrease in another peripheral group having a smaller chief ray angle than the illustrated peripheral group PG1.

In addition, in the design process described above, all nanoposts included in the first nano-optical microlens 131 and the fourth nano-optical microlens 134 which are not illustrated may be moved in the central direction by the interval st, and there may be no additional movement. In this case, a distance by which the center of a distance between the first nano-optical microlens 131 and the fourth nano-optical microlens 134 is offset with respect to the center of a distance between the first pixel 111 and the fourth pixel 114 facing each other is equal to the interval st. However, this is an example and the present disclosure is not limited thereto. For example, all nanoposts included in the first nano-optical microlens 131 and the fourth nano-optical microlens 134 may also be additionally moved in the central direction or in a direction opposite to the central direction. In this case, the additional movement distance may be less than the interval sb and the interval sr. Therefore, a distance by which the center of the first nano-optical microlens 131 is offset with respect to the center of the corresponding first pixel 111 and a distance by which the center of the fourth nano-optical microlens 134 is offset with respect to the center of the corresponding fourth pixel 114 may be slightly different from the interval st but may be within a range that is less than st+sr which is the first offset interval m1 and greater than st−sb which is the second offset interval m2. In other words, a distance by which the centers of the first and fourth nano-optical microlenses 131 and 134 respectively corresponding to the first and fourth pixels 111 and 114 for sensing green light are offset with respect to the centers of corresponding pixels may be set to be less than a distance by which the center of the third nano-optical microlens 133 corresponding to the third pixel 113 for sensing red light are offset with respect to the center of the third pixel 113, and may be set to be greater than a distance by which the center of the fourth nano-optical microlens 134 corresponding to the fourth pixel 114 for sensing blue light are offset with respect to the center of the fourth pixel 114. However, this is an example and the present disclosure is not limited thereto.

Although FIG. 7A illustrate that the third pixel 113 is aligned with the third color filter 123 and the second pixel 112 is aligned with the second color filter 122, this is an example. The center of the third color filter 123 may be offset with respect to the center of the third pixel 113 by a preset distance, and the center of the second color filter 122 may also be offset with respect to the center of the second pixel 112 by a preset distance. Also, the centers of the first color filter 121 and the fourth color filter 124 may be offset with respect to the centers of the corresponding first pixel 111 and fourth pixels 114 by a preset distance, which are not illustrated. A direction of the preset distance may be a central direction, and the preset distance may be less than the interval st.

Figure 7B:
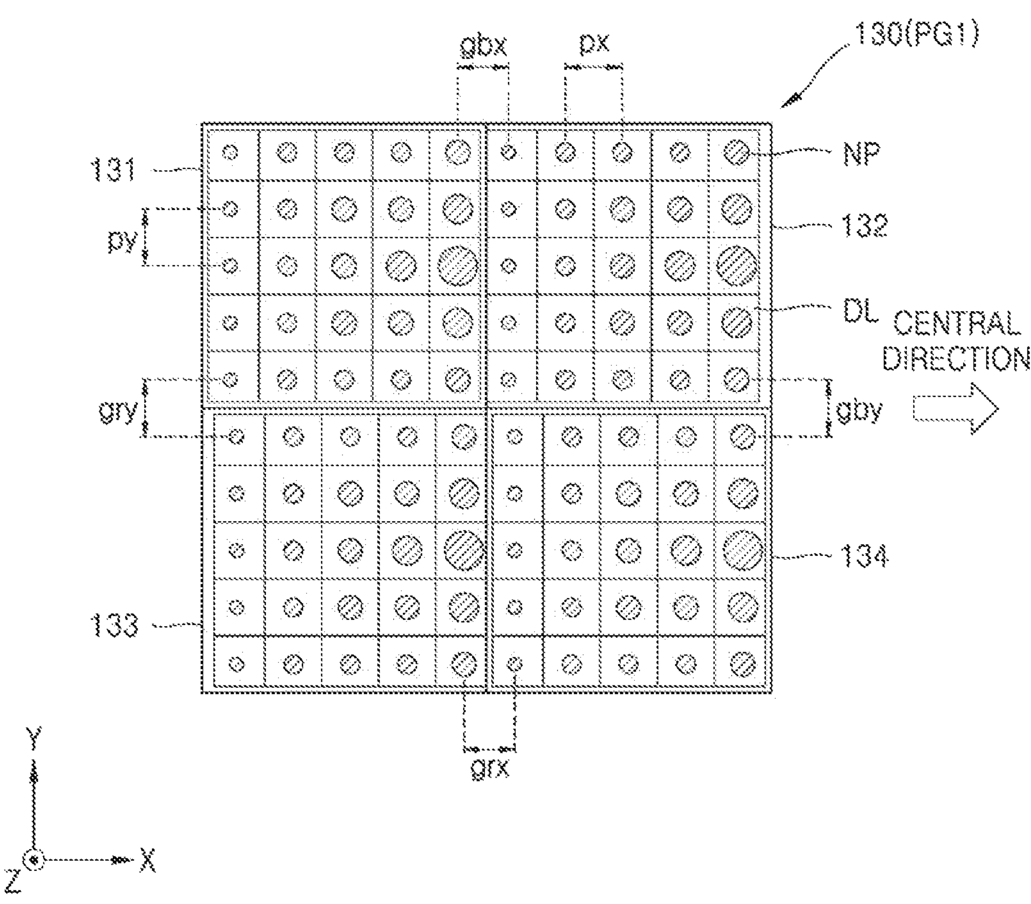
FIG. 7B is a plan view schematically illustrating the left peripheral group of the nano-optical microlens array illustrated in FIG. 7A.

FIG. 7B is a plan view schematically illustrating a left peripheral group of the nano-optical microlens array illustrated in FIG. 7A.

Intervals between directly adjacent nanostructures with boundaries between the first, second, third, and fourth nano-optical microlenses 131, 132, 133, and 134 in the peripheral group PG1 therebetween according to setting of positions of nanostructures included in each of the first, second, third, and fourth nano-optical microlenses 131, 132, 133, and 134, which are described with reference to FIG. 7A, may be different from the center group CG described with reference to FIG. 6

In the peripheral group PG1 at a position where an azimuth angle is 180 degrees, there may be relationships of gbx<px, grx<px, gry=py, and gby=py.

A first interval gbx, which is an interval between two nanostructures directly facing each other with a boundary between the first nano-optical microlens 131 and the second nano-optical microlens 132 therebetween, may be less than the arrangement period px. The second interval gry, which is an interval between two nanostructures directly facing each other with a boundary between the first nano-optical microlens 131 and the third nano-optical microlens 133 therebetween, may be equal to the arrangement period py.

The third interval grx, which is an interval between two nanostructures directly facing each other with a boundary between the fourth nano-optical microlens 134 and the third nano-optical microlens 133 therebetween, may be less than the arrangement period px. The fourth interval gby, which is an interval between two nanostructures directly facing each other with a boundary between the fourth nano-optical microlens 134 and the second nano-optical microlens 132 therebetween, may be equal to the arrangement period py.

As explained in FIG. 7A, sr and sb may have larger values as the chief ray angle increases, and accordingly, a difference between the interval gbx and the arrangement period px and a difference between interval grx and the arrangement period px may also increase as the chief ray angle increases.

In the design process described with reference to FIG. 7A, there may be or may not be individual microshift in addition to a main shift in the nanostructures included in the first nano-optical microlens 131 and the fourth nano-optical microlens 134. The individual microshift distances of the nanostructures included in the first nano-optical microlens 131 and the fourth nano-optical microlens 134 may be less than the interval sr or sb, and accordingly, whether there is an individual microshift in the nanostructures included in the first nano-optical microlens 131 and the fourth nano-optical microlens 134 may not affect the relationships of gbx<px and grx<px.

In addition, an angle of a chief ray incident on the peripheral group PG1 at a position where an azimuth angle is 180 degrees may be reflected to a shape distribution of the nanostructures NP included in each of the first, second, third, and fourth nano-optical microlenses 131, 132, 133, and 134 illustrated in FIG. 7B. Among the nanostructures NP of each of the first, second, third, and fourth nano-optical microlenses 131, 132, 133, and 134 in the peripheral group PG1, the nanostructures NP close to the center of the nano-optical microlens array 130 may be greater in diameter, and the nanostructures NP away from the center of the nano-optical microlens array 130 may be smaller in diameter. When compared with a phase profile of each of the first, second, third, and fourth nano-optical microlenses 131, 132, 133, and 134 in the center group CG of the nano-optical microlens array 130 illustrated in FIG. 6, a shape distribution of the nanostructures NP of each of the first, second, third, and fourth nano-optical microlenses 131, 132, 133, and 134 in the peripheral group PG1 of the nano-optical microlens array 130 may be determined such that a position where the greatest phase delay occurs inside each of the first, second, third, and fourth nano-optical microlenses 131, 132, 133, and 134 is at the center of the pixel array 1100 or toward the center of the nano-optical microlens array 130.

Figure 8A:
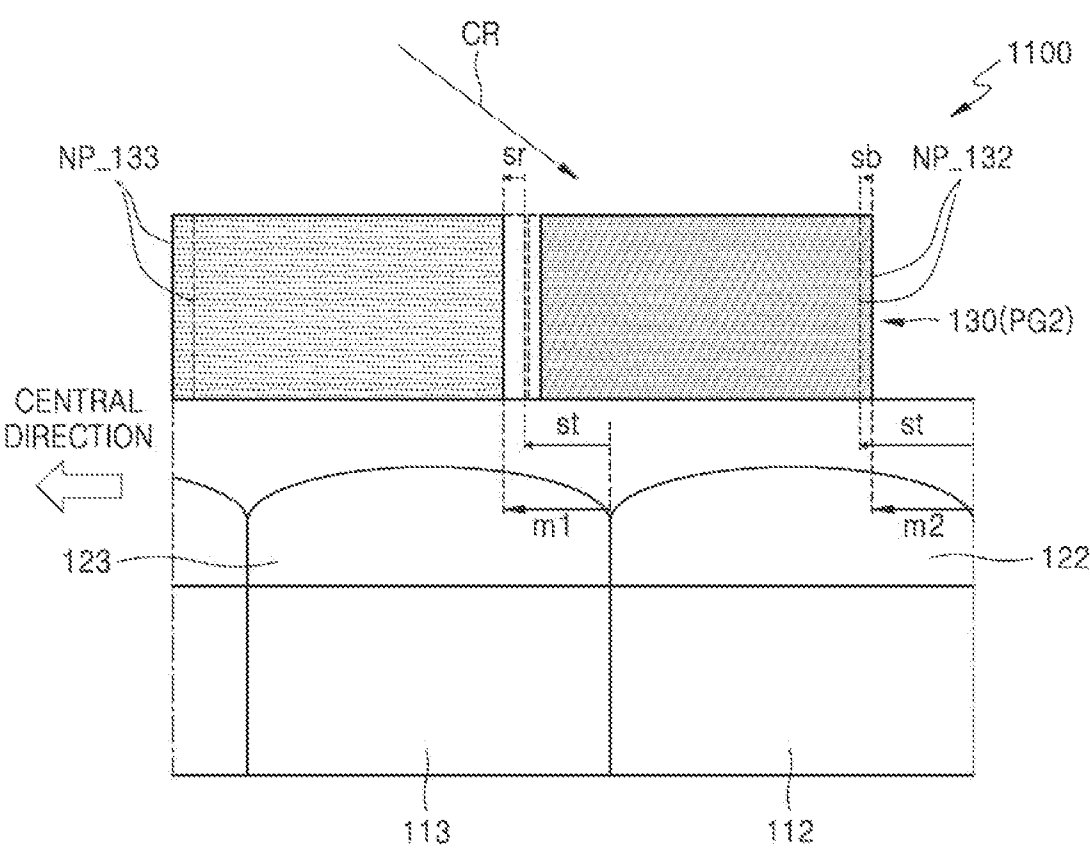
FIG. 8A is a cross-sectional view conceptually illustrating the establishment of a relative positional relationship between nanostructures forming a right peripheral group of a nano-optical microlens array in a pixel array of an image sensor according to an embodiment.

FIG. 8A is a cross-sectional view conceptually illustrating the establishment of a relative positional relationship between nanostructures included in a right peripheral group of a nano-optical microlens array in a pixel array of an image sensor according to an embodiment.

The peripheral group PG2 included in the pixel array 1100 shows a relative positional relationship illustrated in FIGS. 3 and 4, and the pixel array 1100 shows a cross-sectional view taken along line 8-8' of the peripheral group PG2 illustrated in FIG. 3. Like the description made with reference to FIG. 7A, nanostructures in the peripheral group PG2 are not illustrated for the sake of convenience, and all nanostructures included in the third nano-optical microlens 133 are denoted as NP_133, and all nanostructures included in the second nano-optical microlens 132 are denoted as NP_132.

A process of setting a first offset interval m1 and a second offset interval m2 is similar to the setting described with reference to FIG. 7A. However, because the peripheral group PG2 is in the right of the center of the nano-optical microlens array 130, descriptions on a main shift direction related to the interval st and individual microshift directions related to the intervals sr and sb are opposite to the description made with reference to FIG. 7A, and the other descriptions are similar to each other.

First, all the nanostructures NP_133 included in the third nano-optical microlens 133 and all the nanostructures NP_132 included in the second nano-optical microlens 132 are moved in a central direction by the interval st. In this case, nanostructures included in the first nano-optical microlens 131 and nanostructures included in the fourth nano-optical microlens 134 which are not illustrated are also moved in the central direction by the interval st.

Next, all the nanostructures NP_133 included in the third nano-optical microlens 133 are further moved in the central direction by an interval sr. All the nanostructures NP_132 included in the second nano-optical microlens 132 are moved by an interval sb in a direction opposite to the central direction.

According to the design process, a first offset interval m1 is st+sr, and a second offset interval m2 is st−sb. Directions of the first offset interval m1 and the second offset interval m2 are the same as the central direction. In the peripheral group PG2, sr and sb are greater than 0, that is, st+sr is greater than st−sb. In other words, in the peripheral group PG2, the centers of the first, second, third, and fourth nano-optical microlenses 131, 132, 133, and 134 are offset with respect to the centers of the corresponding first, second, third, and fourth pixels 111, 112, 113, and 114, and the offset distances may be different from each other in at least two of the first, second, third, and fourth nano-optical microlenses 131, 132, 133, and 134. For example, a distance by which the center of the third nano-optical microlens 133 corresponding to the third pixel 113 for sensing red light is offset with respect to the center of the third pixel 113 may be greater than a distance by which the center of the second nano-optical microlens 132 corresponding to the second pixel 112 for sensing blue light is offset with respect to the center of the second pixel 112.

Also, |m1−m2| which is a difference between the first offset interval m1 and st+sr and the second offset interval m2 and st−sb, that is, sr+sb may increase as a chief ray angle increases. That is, a difference between the first offset interval m1 and the second offset interval m2 may increase in a peripheral group having a greater chief ray angle than the illustrated peripheral group PG2, and the difference between the first offset interval m1 and the second offset interval m2 may decrease in another peripheral group having a smaller chief ray angle than the illustrated peripheral group PG2.

In addition, in the design process described above, all nanoposts included in the first nano-optical microlens 131 and the fourth nano-optical microlens 134 which are not illustrated may be moved in the central direction by the interval st, and there may be no additional movement. Alternatively, all nanoposts included in the first nano-optical microlens 131 and the fourth nano-optical microlens 134 may also be additionally moved in the central direction or in a direction opposite to the central direction. In this case, the additional movement distance may be less than the interval sb and the interval sr. Therefore, a distance by which the center of the first nano-optical microlens 131 is offset with respect to the center of the corresponding first pixel 111 and a distance by which the center of the fourth nano-optical microlens 134 is offset with respect to the center of the corresponding fourth pixel 114 may be within a range that is less than st+sr which is the first offset interval m1 and greater than st−sb which is the second offset interval m2.

Figure 8B:
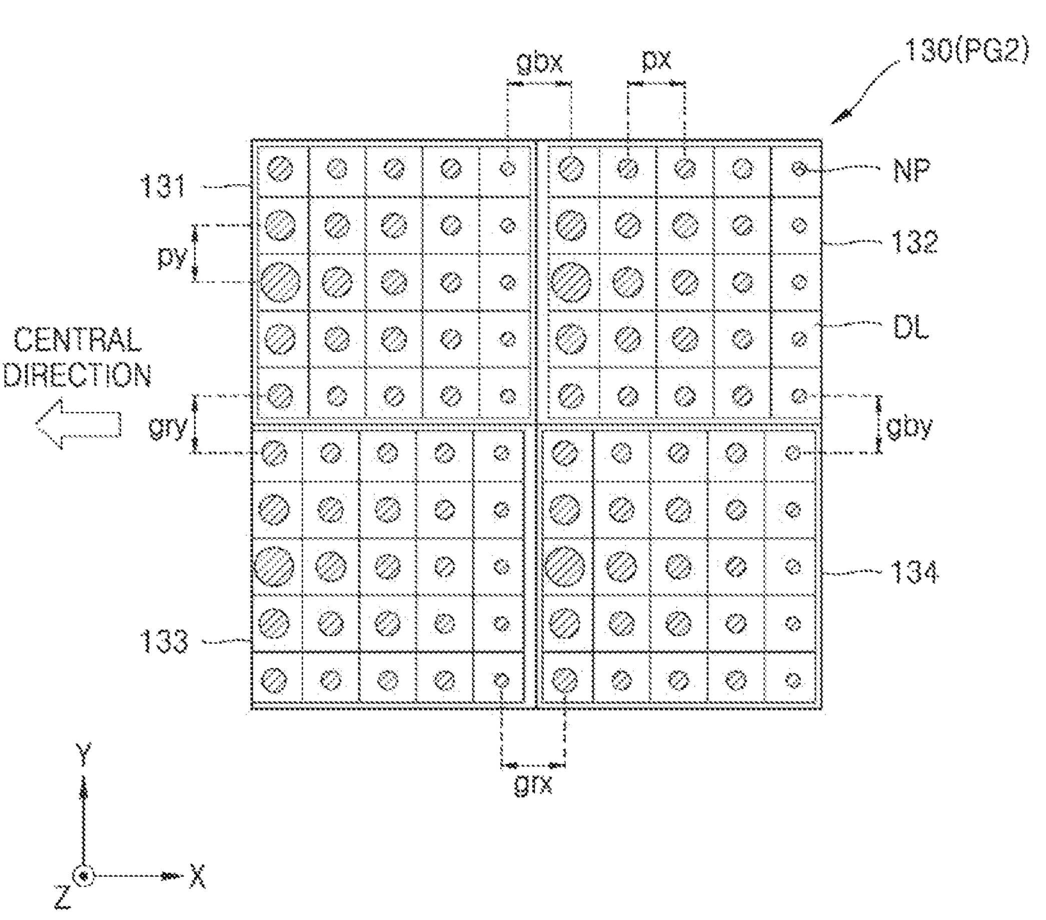
FIG. 8B is a plan view schematically illustrating the right peripheral group of the nano-optical microlens array illustrated in FIG. 8A.

FIG. 8B is a plan view schematically illustrating a left peripheral group of the nano-optical microlens array illustrated in FIG. 8A.

Intervals between directly adjacent nanostructures with boundaries between the first, second, third, and fourth nano-optical microlenses 131, 132, 133, and 134 in the peripheral group PG2 therebetween according to setting of positions of nanostructures included in each of the first, second, third, and fourth nano-optical microlenses 131, 132, 133, and 134, which are described with reference to FIG. 8A, may be different from the center group CG described with reference to FIG. 6 and also different from the peripheral group PG1 described in FIG. 7B.

In the peripheral group PG2 at a position where an azimuth angle is 0 degrees, there may be relationships of gbx>px, grx>px, gry=py, and gby=py.

A first interval gbx, which is an interval between two nanostructures directly facing each other with a boundary between the first nano-optical microlens 131 and the second nano-optical microlens 132 therebetween, may be greater than the arrangement period px. The second interval gry, which is an interval between two nanostructures directly facing each other with a boundary between the first nano-optical microlens 131 and the third nano-optical microlens 133 therebetween, may be equal to the arrangement period py.

The third interval grx, which is an interval between two nanostructures directly facing each other with a boundary between the fourth nano-optical microlens 134 and the third nano-optical microlens 133 therebetween, may be greater than the arrangement period px. The fourth interval gby, which is an interval between two nanostructures directly facing each other with a boundary between the fourth nano-optical microlens 134 and the second nano-optical microlens 132 therebetween, may be equal to the arrangement period py.

In the peripheral group PG2 where an azimuth angle is 0 degrees, a difference between the interval gbx and the arrangement period px and a difference between the interval grx and the arrangement period px may also increase as a chief ray angle increases.

As described with reference to FIG. 8A, in in the peripheral group PG2, individual microshift distances of the nanostructures included in the first nano-optical microlens 131 and the fourth nano-optical microlens 134 may be less than the interval sr or sb, and accordingly, whether there is an individual microshift in the nanostructures included in the first nano-optical microlens 131 and the fourth nano-optical microlens 134 may not affect the relationships of gbx>px and grx>px.

In addition, an angle of a chief ray incident on the peripheral group PG2 at a position where an azimuth angle is 0 degrees may be reflected to a shape distribution of the nanostructures NP included in each of the first, second, third, and fourth nano-optical microlenses 131, 132, 133, and 134 illustrated in FIG. 8B. Among the nanostructures NP of each of the first, second, third, and fourth nano-optical microlenses 131, 132, 133, and 134 in the peripheral group PG2, the nanostructures NP close to the center of the nano-optical microlens array 130 may be greater in diameter, and the nanostructures NP away from the center of the nano-optical microlens array 130 may be smaller in diameter. When compared with a phase profile of each of the first, second, third, and fourth nano-optical microlenses 131, 132, 133, and 134 in the center group CG of the nano-optical microlens array 130 illustrated in FIG. 6, a shape distribution of the nanostructures NP of each of the first, second, third, and fourth nano-optical microlenses 131, 132, 133, and 134 in the peripheral group PG2 of the nano-optical microlens array 130 may be determined such that a position where the greatest phase delay occurs inside each of the first, second, third, and fourth nano-optical microlenses 131, 132, 133, and 134 is at the center of the pixel array 1100 or toward the center of the nano-optical microlens array 130. A shape distribution of the nanostructures NP of each of the first, second, third, and fourth nano-optical microlenses 131, 132, 133, and 134 in the peripheral groups PG3 to PG8 at other positions, which is described below, may also be set by applying the same principle.

FIGS. 9A to 9F are plan views schematically illustrating peripheral groups at various positions in a nano-optical microlens array provided in a pixel array of an image sensor according to an embodiment.

Figure 9A:
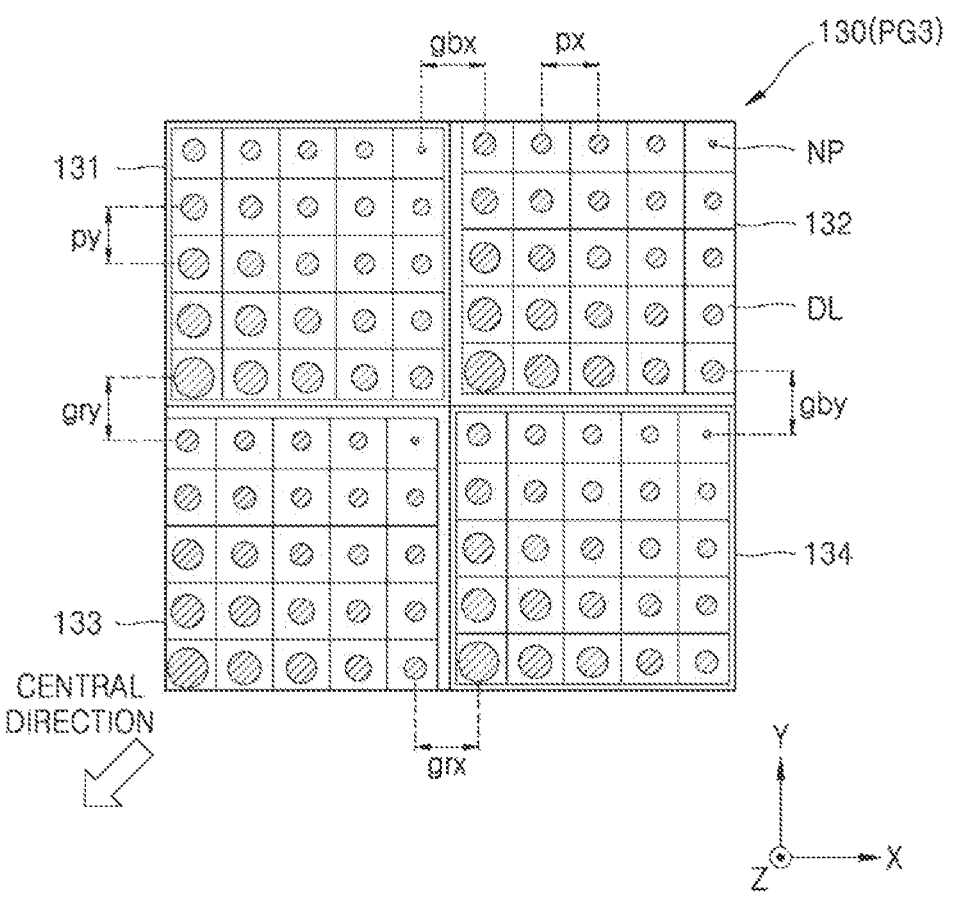
FIGS. 9A, 9B, 9C, 9D, 9E and 9F are plan views schematically illustrating peripheral groups at various positions in a nano-optical microlens array provided in a pixel array of an image sensor according to an embodiment.

FIG. 9A illustrates the peripheral group PG3 at a position where an azimuth angle is greater than 0 degrees and less than 90 degrees, as illustrated in FIG. 3.

A positional relationship between the illustrated nanostructures NP may be set in a similar manner to the description made with reference to FIGS. 7A and 8A. That is, in the peripheral group PG3, all the nanostructures NP in the first, second, third, and fourth nano-optical microlenses 134 may be main-shifted in the indicated central direction, all the nanostructures NP in the second nano-optical microlens 132 may be individually shifted again in a direction opposite to a central direction, and all the nanostructures NP in the third nano-optical microlens 133 may be individually shifted in the central direction.

Accordingly, in the peripheral group PG3, relationships of gbx>px, grx>px, gry>py, and gby>py may be satisfied.

A first interval gbx, which is an interval between two nanostructures directly facing each other with a boundary between the first nano-optical microlens 131 and the second nano-optical microlens 132 therebetween, may be greater than the arrangement period px. The second interval gry, which is an interval between two nanostructures directly facing each other with a boundary between the first nano-optical microlens 131 and the third nano-optical microlens 133 therebetween, may be greater than the arrangement period py.

The third interval grx, which is an interval between two nanostructures directly facing each other with a boundary between the fourth nano-optical microlens 134 and the third nano-optical microlens 133 therebetween, may be greater than the arrangement period px. The fourth interval gby, which is an interval between two nanostructures directly facing each other with a boundary between the fourth nano-optical microlens 134 and the second nano-optical microlens 132 therebetween, may be greater than the arrangement period py.

In the design process described above, there may be or may not be individual microshifts in the nanostructures included in the first nano-optical microlens 131 and the fourth nano-optical microlens 134. The individual microshift of the nanostructures included in each of the first nano-optical microlens 131 and the fourth nano-optical microlens 134 may be less than the individual microshift of the nanostructures included in each of the second nano-optical microlens 132 and the third nano-optical microlens 133, which may not affect relationships of gbx>px, grx>px, gry>py, and gby>py. This relationship may be equally applied to peripheral groups PG4 to PG8 at various positions, which is described below.

Figure 9B:
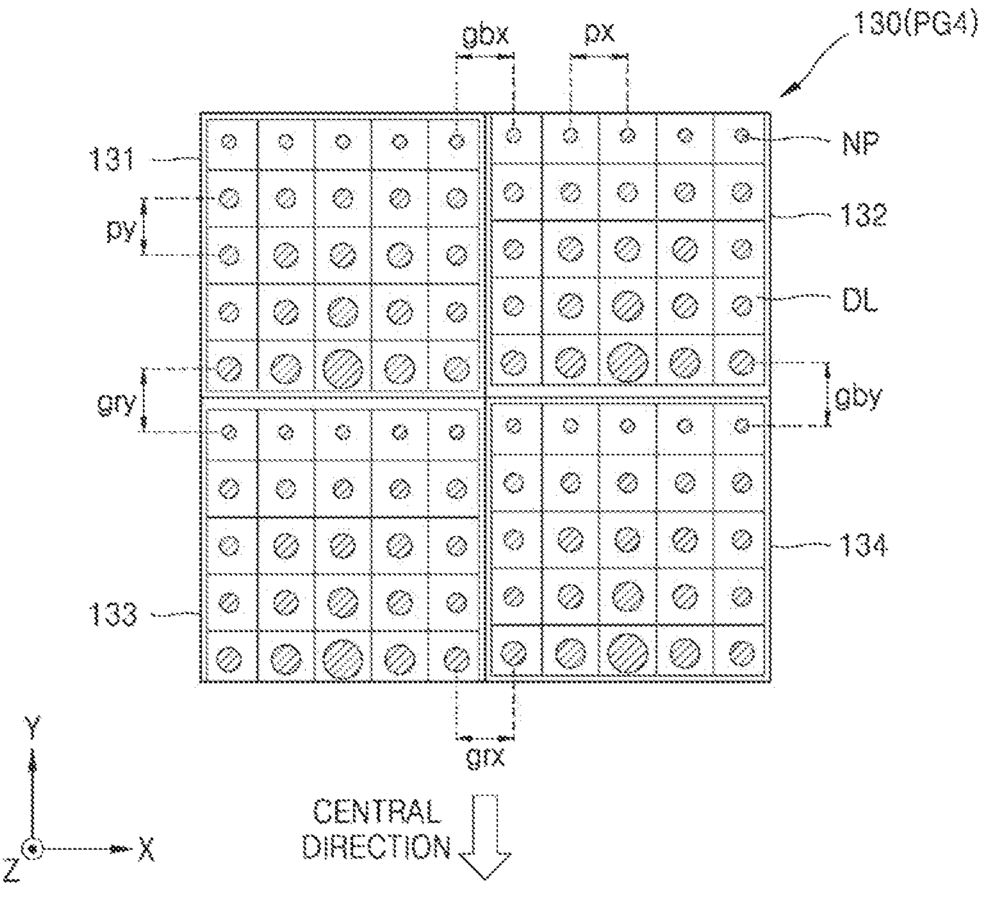

FIG. 9B illustrates the peripheral group PG4 at a position where an azimuth angle is 90 degrees, as illustrated in FIG. 3.

In the peripheral group PG4, relationships of gbx=px, grx=px, gry>py, and gby>py may be satisfied. A difference between the interval gby and the arrangement period py and a difference between the interval gry and the arrangement period py may increase as a chief ray angle increases.

Figure 9C:
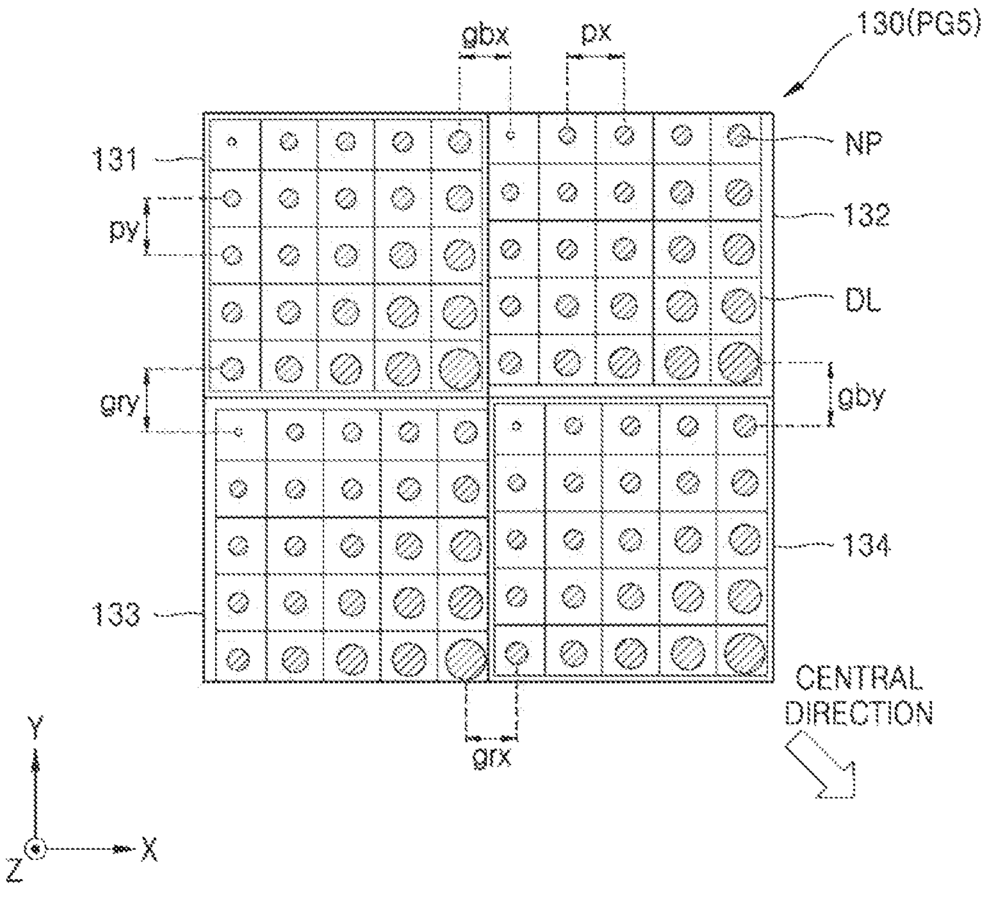

FIG. 9C illustrates the peripheral group PG5 at a position where an azimuth angle is greater than 90 degrees and less than 180 degrees, as illustrated in FIG. 3.

In the peripheral group PG5, relationships of gbx<px, grx<px, gry>py, and gby>py may be satisfied. A difference between the interval gbx and the arrangement period px, a difference between the interval grx and the arrangement period px, a difference between the interval gry and the arrangement period py, and a difference between the interval gby and the arrangement period py may increase as a chief ray angle increases.

Figure 9D:
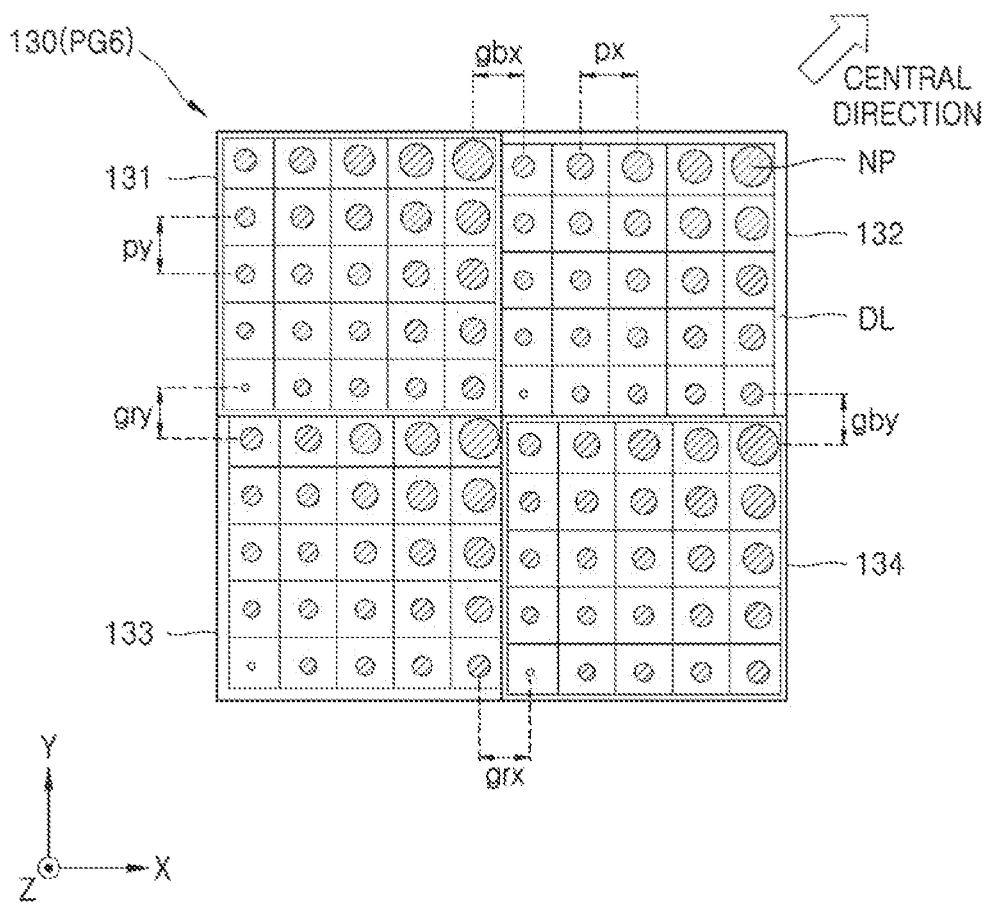

FIG. 9D illustrates the peripheral group PG6 at a position where an azimuth angle is greater than 180 degrees and less than 270 degrees, as illustrated in FIG. 3.

In the peripheral group PG6, relationships of gbx<px, grx<px, gry<py, and gby<py may be satisfied. A difference between the interval gbx and the arrangement period px, a difference between the interval grx and the arrangement period px, a difference between the interval gry and the arrangement period py, and a difference between the interval gby and the arrangement period py may increase as a chief ray angle increases.

Figure 9E:
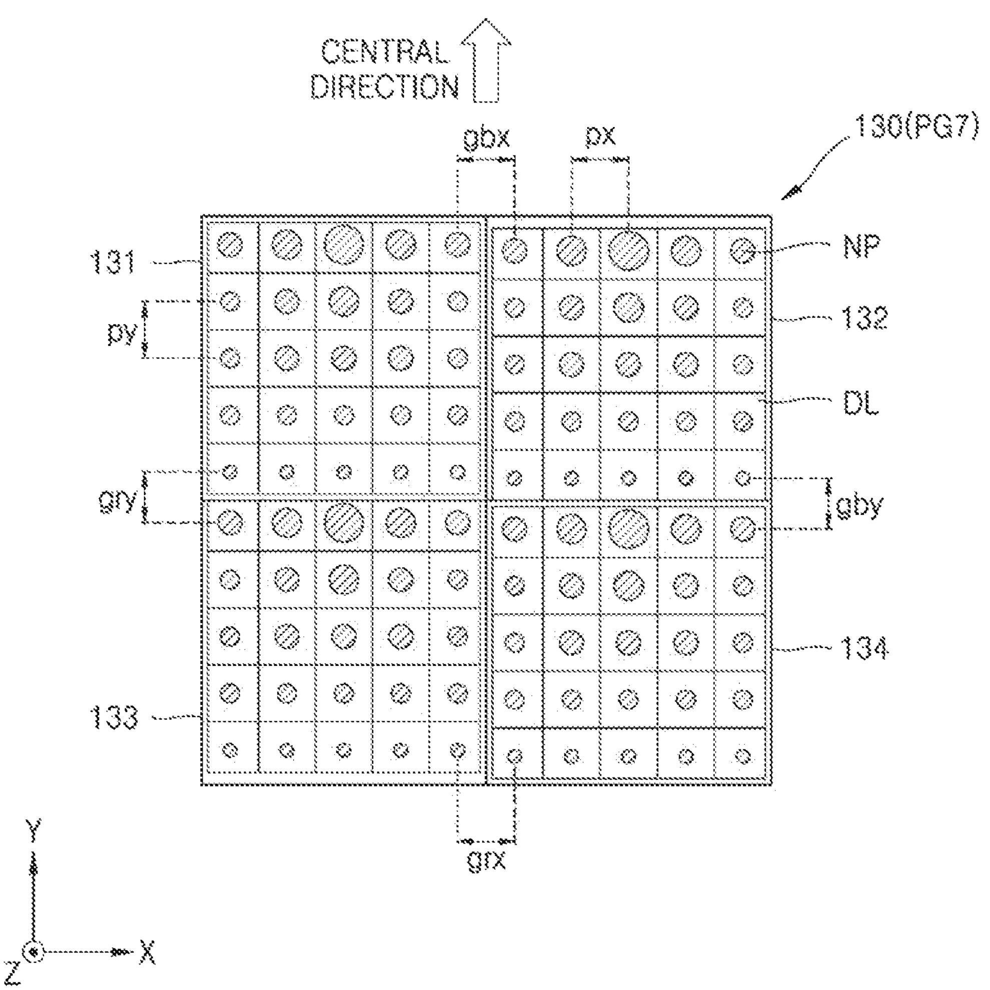

FIG. 9E illustrates the peripheral group PG7 at a position where an azimuth angel is 270 degrees, as illustrated in FIG. 3.

In the peripheral group PG7, relationships of gbx=px, grx=px, gry<py, and gby<py may be satisfied. A difference between the interval gry and the arrangement period py, and a difference between the interval gby and the arrangement period py may increase as a chief ray angle increases.

Figure 9F:
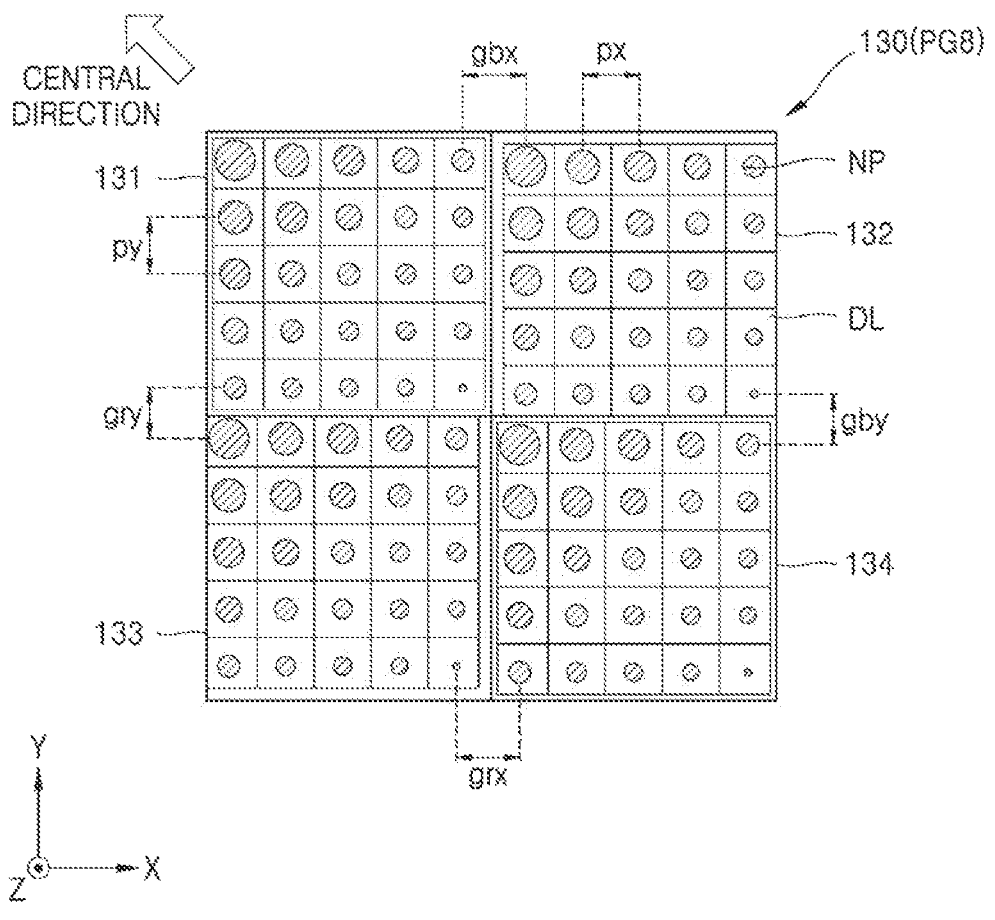

FIG. 9F illustrates the peripheral group PG8 at a position where an azimuth angle is greater than 270 degrees and less than 360 degrees, as illustrated in FIG. 3.

In the peripheral group PG8, relationships of gbx>px, grx>px, gry<py, and gby<py may be satisfied. A difference between the interval gbx and the arrangement period px, a difference between the interval grx and the arrangement period px, a difference between the interval gry and the arrangement period py, and a difference between the interval gby and the arrangement period py may increase as a chief ray angle increases.

Figure 10:
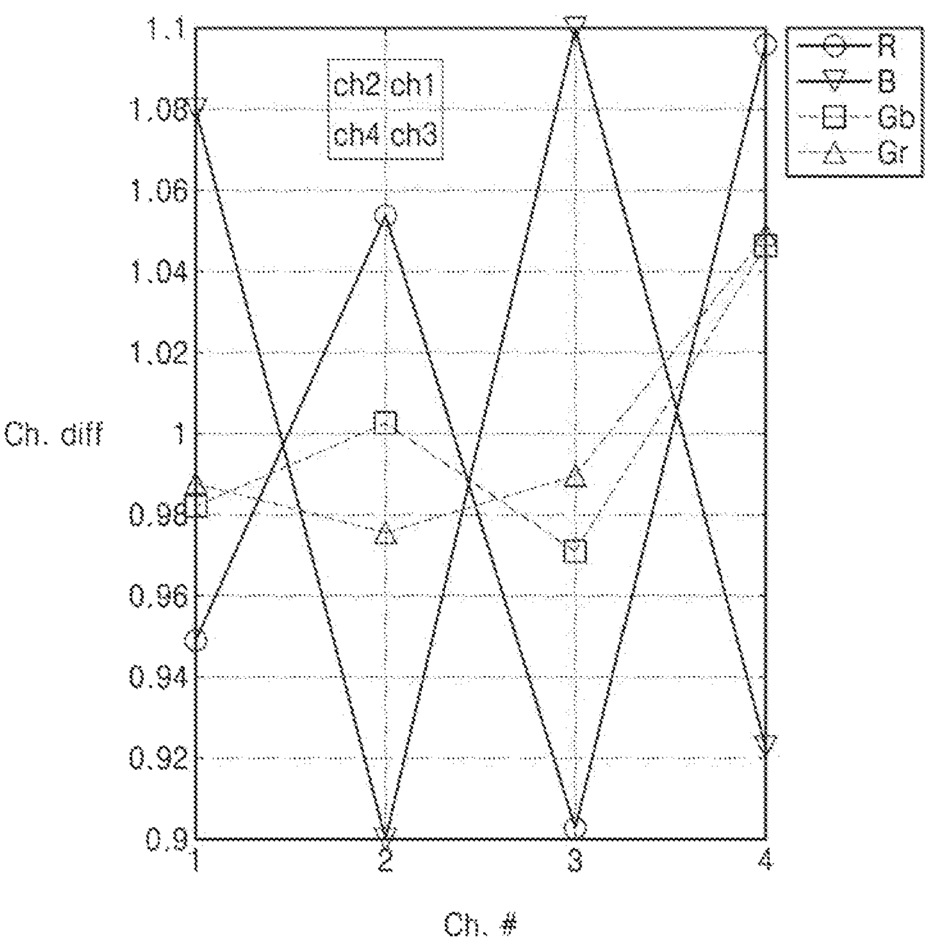
FIG. 10 is a graph illustrating channel differences of an image sensor according to a comparative example.
Figure 11:
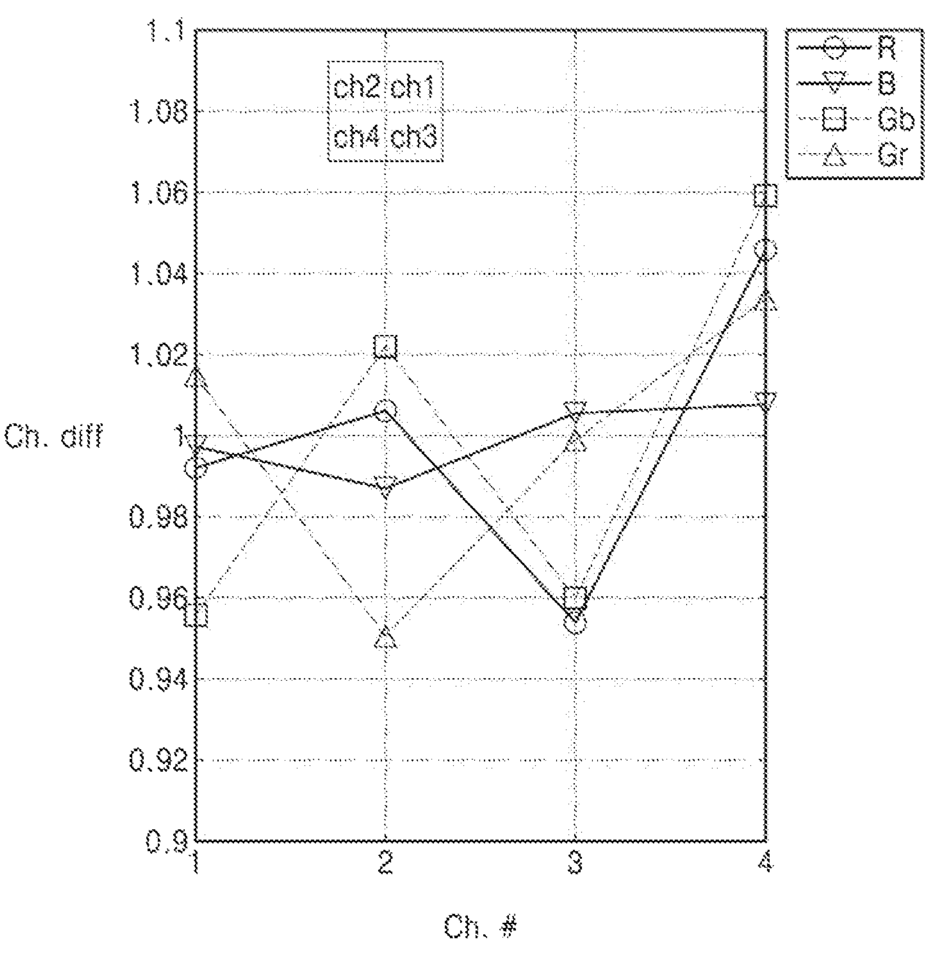
FIG. 11 is a graph illustrating channel differences of an image sensor according to an embodiment.

FIG. 10 is a graph illustrating channel differences of an image sensor according to a comparative example, and FIG. 11 is a graph illustrating channel differences of an image sensor according to an embodiment.

The graphs are obtained in a case where first, second, third, and fourth pixels are respectively green (Gb), blue (B), red (R), and green (Gr) pixels. In the comparative example, only main shift is applied to the design of nanostructures, that is, relative positional relationships of the nanostructures included in each of the first, second, third, and fourth nano-optical microlenses 131, 132, 133, and 134 are the same in a plurality of peripheral groups. FIG. 11 illustrates an embodiment of the present disclosure, and in a peripheral group at a position where a chief ray angle is 45 degrees, nanostructures included in the second nano-optical microlens 132 are individually shifted by 30 nm in a direction away from the center, and nanostructures included in the third nano-optical microlens 133 are individually shifted by 30 nm in the center in addition to a main shift of nanostructures included in each of the first, second, third, and fourth nano-optical microlenses 131, 132, 133, and 134.

Ch.diff of a vertical axis of the graph denotes a channel difference. A numerical value 1 of the vertical axis may be a reference value, for example, a signal value of one channel of a pixel corresponding to a center group. In FIG. 11 for the embodiment, it can be seen that channel differences Ch.diff of a pixel R and a pixel B are improved compared to the comparative example.

When comparing the two graphs, it can be interpreted that channel differences of the pixel Gb and the pixel Gr related to the first and fourth nano-optical microlenses 131 and 134 may also be somewhat affected by individual shifts of the nanostructures included in the second nano-optical microlens 132 and individual shifts of the nanostructures included in the third nano-optical microlens 133. In consideration of this, the individual shifts of the nanostructures of the first and fourth nano-optical microlenses 131 and 134 in a fine range described above may also be further applied during design.

Although the descriptions made above with reference to FIGS. 5A to 9F is made by assuming that the center group CG is in relationships of $gbx=grx=px$ and $gry=gby=by$, the present disclosure is not limited thereto. For example, when first, second, third, and fourth intervals defined in the center group CG are referred to respectively as gbx0, gry0, grx0, and gby0, the first, second, third, and fourth intervals may be different from the arrangement periods px and py, and for example, may be less than the arrangement periods px and py.

The first, second, third, and fourth intervals defined in the peripheral group PG may also be explained as relationships with the first, second, third, and fourth intervals corresponding thereto and defined in the center group CG. That is, any one of the first, second, third, and fourth intervals defined in the peripheral group PG may be different from any one of the first, second, third, and fourth intervals corresponding thereto and defined in the center group CG. In other words, the interval gbx may be different from the first interval gbx0, the interval grx may be different from the third interval grx0, the interval gry may be different from the second interval gry0, or the interval gby may be different from the fourth interval gby0. The intervals gbx, gry, grx, and gby of the peripheral group PG may be represented as follows as relationships of the first, second, third, and fourth intervals gbx0, gry0, grx0, and gby0 of the center group CG, depending on positions of respective azimuth angles.

As illustrated in FIG. 7B, in the peripheral group PG1 at a position where an azimuth angle is 180 degrees, there may be relationships of $gbx<gbx0$, $grx<grx0$, $gry=gry0$, and $gby=gby0$. A difference between the interval gbx and the first interval gbx0 and a difference between the interval grx and the third interval grx0 may increase as a chief ray angle increases.

As illustrated in FIG. 8B, in the peripheral group PG2 at a position where an azimuth angle is 0 degrees, there may be relationships of $gbx>gbx0$, $grx>grx0$, $gry=gry0$, and $gby=gby0$. The difference between the interval gbx and the first interval gbx0 and the difference between the interval grx and the third interval grx0 may increase as the chief ray angle increases.

As illustrated in FIG. 9A, in the peripheral group PG3 at a position where an azimuth angle is greater than 0 degrees and less than 90 degrees, relationships of $gbx>gbx0$, $grx>brx0$, $gry>bry0$, and $gby>gby0$ may be satisfied. The difference between the interval gbx and the first interval gbx0, the difference between the interval grx and the third interval grx0, a difference between the interval gry and the second interval gry0, and a difference between the interval gby and the fourth interval gby0 may increase as the chief ray angle increases.

As illustrated in FIG. 9B, in the peripheral group PG4 at a position where an azimuth angle is 90 degrees, relationships of $gbx=gbx0$, $grx=grx0$, $gry>gry0$, and $gby>gby0$ may be satisfied. A difference between the interval gby and the fourth interval gby0 and a difference between the interval gry and the second interval gry0 may increase as the chief ray angle increases.

As illustrated in FIG. 9C, in the peripheral group PG5 at a position where an azimuth angle is greater than 90 degrees and less than 180 degrees, relationships of $gbx<gbx0$, $grx<grx0$, $gry>gry0$, and $gby>gby0$ may be satisfied. The difference between the interval gbx and the first interval gbx0, the difference between the interval grx and the third interval grx0, the difference between the interval gry and the second interval gry0, and the difference between the interval gby and the fourth interval gby0 may increase as the chief ray angle increases.

As illustrated in FIG. 9D, in the peripheral group PG6 at a position where an azimuth angle is greater than 180 degrees and less than 270 degrees, relationships of $gbx<gbx0$, $grx<grx0$, $gry<gry0$, and $gby<gby0$ may be satisfied. The difference between the interval gbx and the first interval gbx0, the difference between the interval grx and the third interval grx0, the difference between the interval gry and the second interval gry0, and the difference between the interval gby and the fourth interval gby0 may increase as the chief ray angle increases.

As illustrated in FIG. 9E, in the peripheral group PG7 at a position where an azimuth angle is 270 degrees, relationships of $gbx=gbx0$, $grx=grx0$, $gry<gry0$, and $gby<gby0$ may be satisfied. The difference between the interval gry and the second interval gry0 and the difference between the interval gby and the fourth interval gby0 may increase as a chief ray angle increases.

As illustrated in FIG. 9F, in the peripheral group PG8 at a position where an azimuth angle is greater than 270 degrees and less than 360 degrees, relationships of $gbx>gbx0$, $grx>grx0$, $gry<gry0$, and $gby<gby0$ may be satisfied. The difference between the interval gbx and the first interval gbx0, the difference between the interval grx and the third interval grx0, the difference between the interval gry and the second interval gry0, and the difference between the interval gby and the fourth interval gby0 may increase as a chief ray angle increases.

FIGS. 12 to 16 are plan views illustrating nano-optical microlens arrays that may be provided in pixel arrays of image sensors according to various embodiments.

Figure 12:
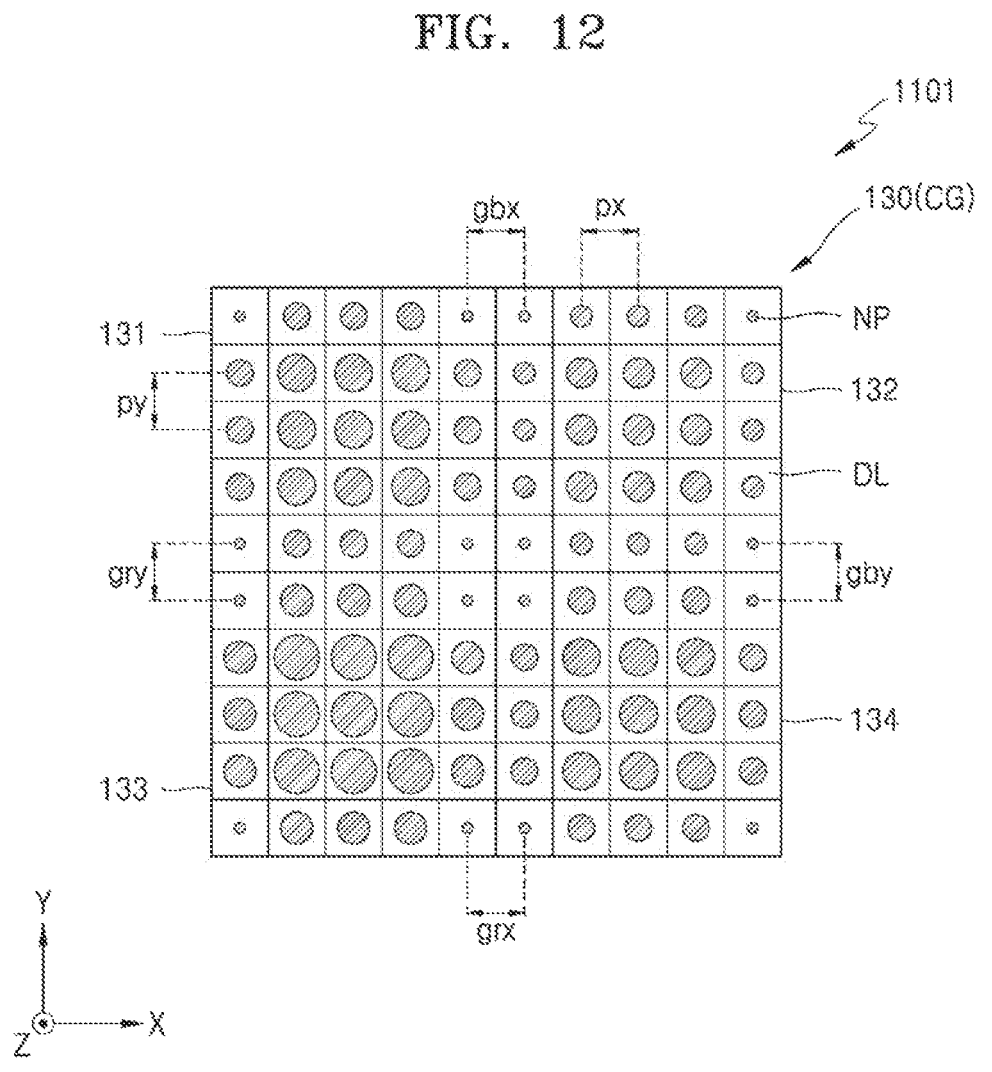

Referring to FIG. 12, first, second, third, and fourth nano-optical microlenses 131, 132, 133, and 134 included in a center group CG of a nano-optical microlens array 130 included in a pixel array 1101 may include nanostructures NP distributed with different sizes.

Although the embodiments described above describe that the nanostructures NP distributed with similar sizes are included in each of the first, second, third, and fourth nano-optical microlenses 131, 132, 133, and 134 for the sake of convenience of description, this is an example and the present disclosure is not limited thereto. For example, diameters or an arrangement of the nanostructures NP included in the first, second, third, and fourth nano-optical microlenses 131, 132, 133, and 134 may be set differently depending on wavelengths of light to be focused. For example, the first and fourth nano-optical microlenses 131 and 134 may be designed by considering a focal length of green light such that the green light is focused on the first and fourth pixels 111 and 114, the second nano-optical microlens 132 may be designed by considering a focal length of blue light such that the blue light is focused on the second pixel 112, and the third nano-optical microlens 133 may be designed by considering a focal length of red light such that the red light is focused on the third pixel 113.

For example, in the nano-optical microlens array 130 illustrated in FIG. 12, a diameter of the nanostructure NP having the greatest cross-sectional diameter in the third nano-optical microlens 133 that focuses red light of the longest wavelength may be greater than a diameter of the nanostructure NP having the greatest cross-sectional diameter in the first and fourth nano-optical microlenses 131 and 134 that focus green light. Also, a diameter of the nanostructure NP having the greatest cross-sectional diameter in the first and fourth nano-optical microlenses 131 and 134 may be greater than a diameter of the nanostructure NP having the greatest cross-sectional diameter in the second nano-optical microlens 132 that focus blue light of the shortest wavelength.

Although FIG. 12 illustrates only the center group CG, a size distribution of the nanostructures NP included in each of the first, second, third, and fourth nano-optical microlenses 131, 132, 133, and 134 included in the peripheral groups PG1 to PG8 at various positions described above may change similarly.

Figure 13:
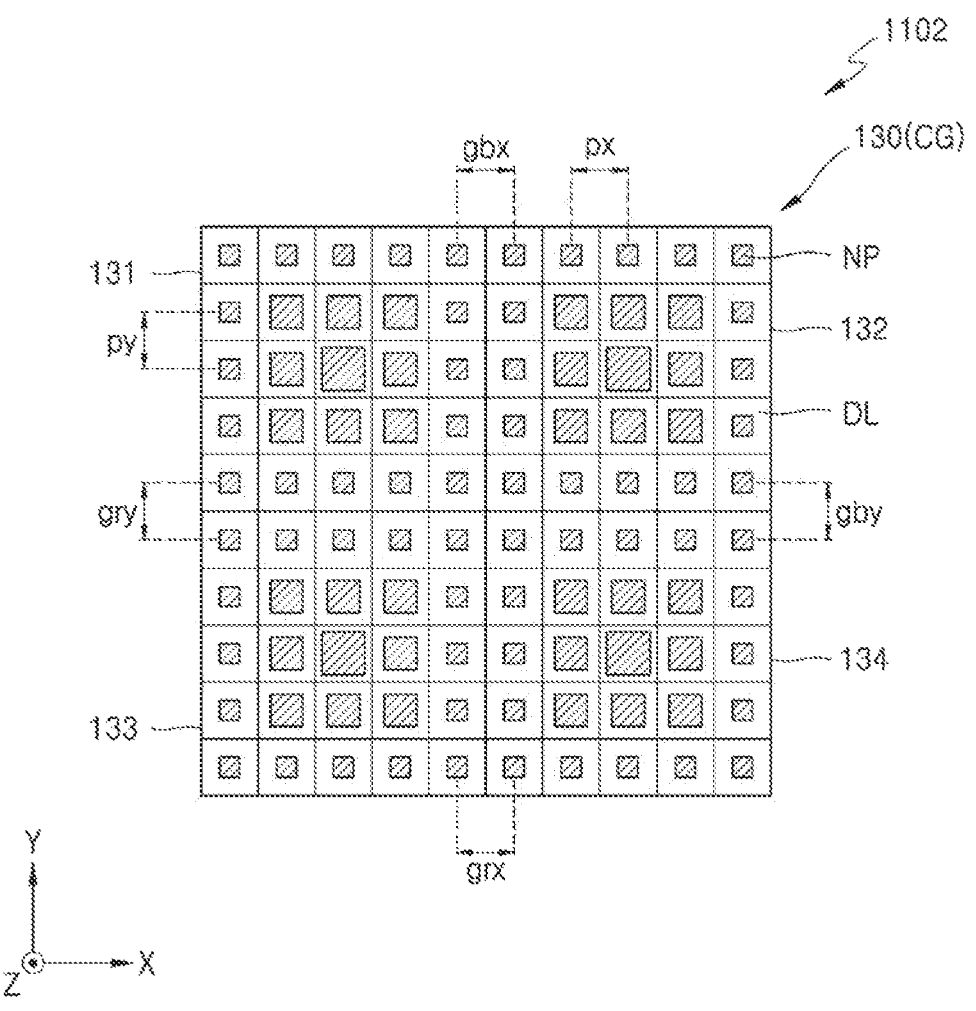

Referring to FIG. 13, first, second, third, and fourth nano-optical microlenses 131, 132, 133, and 134 of a nano-optical microlens array 130 included in a pixel array 1102 may include nanostructures NP of a square pillar shape. FIG. 13 illustrates only the center group CG, and the nanostructures NP included in each of the first, second, third, and fourth nano-optical microlenses 131, 132, 133, and 134 included in the peripheral groups PG1 to PG8 at various positions described above may also have a square pillar shape.

Figure 14:
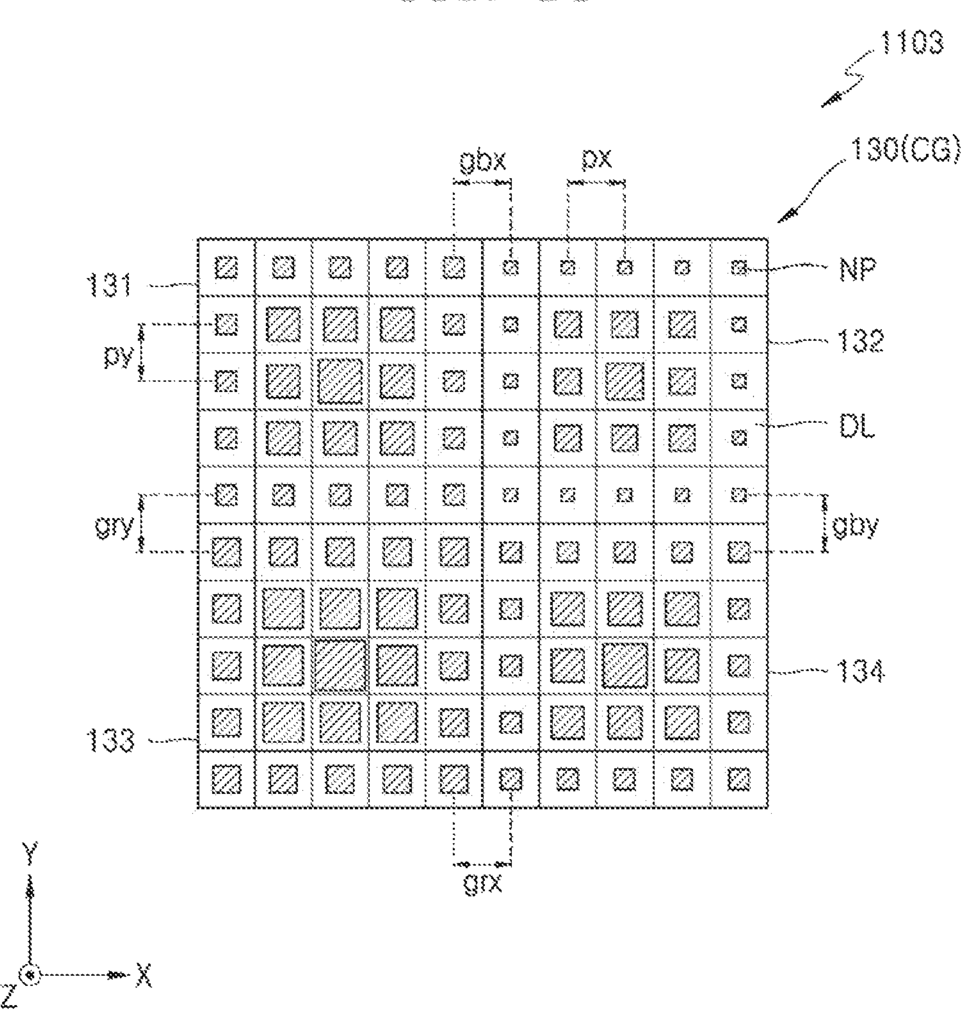

Referring to FIG. 14, first, second, third, and fourth nano-optical microlenses 131, 132, 133, and 134 of a nano-optical microlens array 130 included in a pixel array 1103 have include nanostructures NP of different size distributions like the description made with reference to FIG. 12.

Figure 15A:
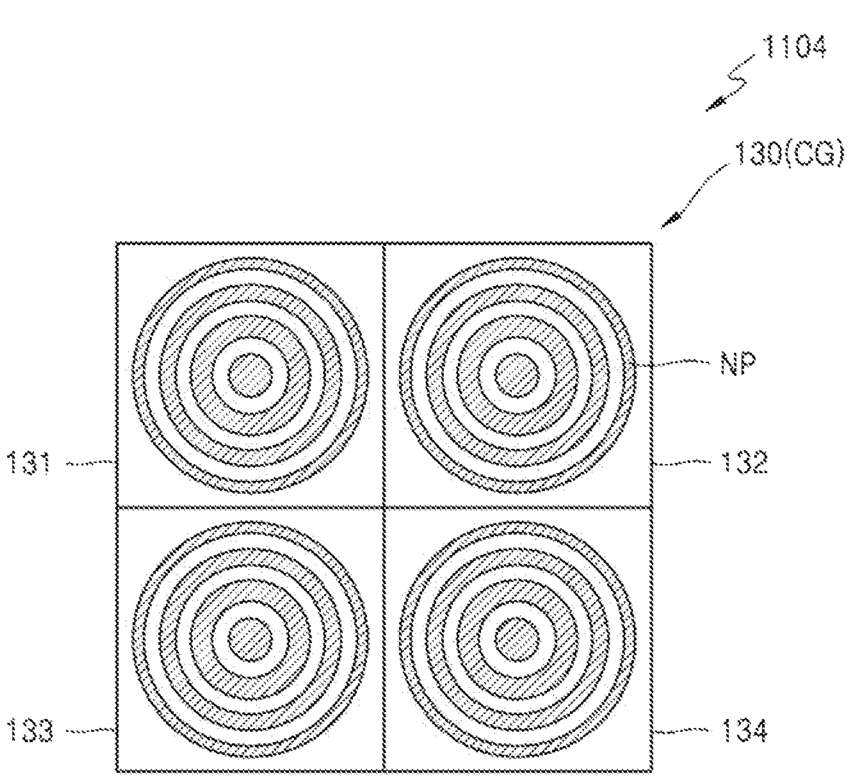

Referring to FIG. 15A, first, second, third, and fourth nano-optical microlenses 131, 132, 133, and 134 included in a center group CG of a nano-optical microlens array 130 provided in a pixel array 1104 may each include nanostructures NP of a concentric ring shape. This configuration is another example of a phase profile having the greatest phase delay at the center.

Figure 15B:
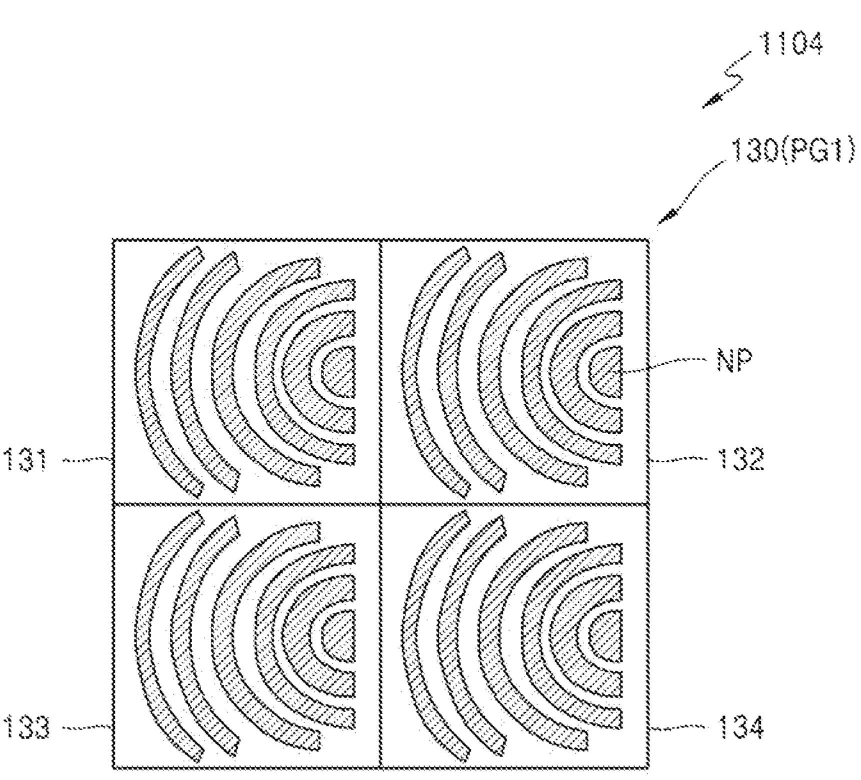
Figure 15C:
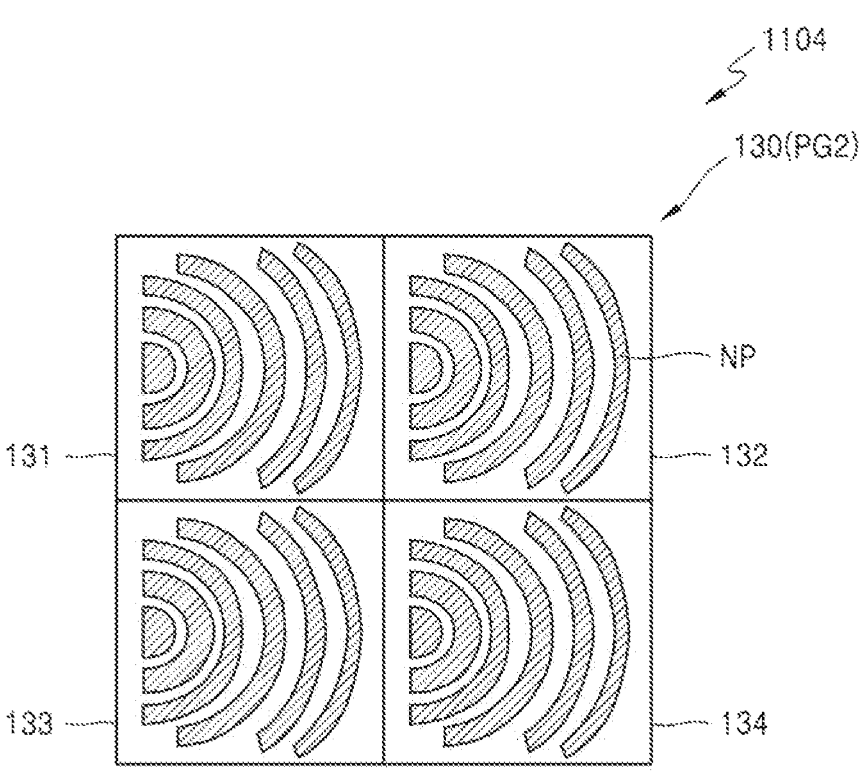

FIGS. 15B and 15C respectively illustrate an example of shapes of the first, second, third, and fourth nano-optical microlenses 131, 132, 133, and 134 included in a left peripheral group PG1 and an example of shapes of the first, second, third, and fourth nano-optical microlenses 131, 132, 133, and 134 included in a right peripheral group PG2. The nanostructures NP are modified from the nanostructures NP in the center group CG to form a phase profile in which a position having the greatest phase delay is shifted toward the center of a nano-optical microlens array.

Figure 16:
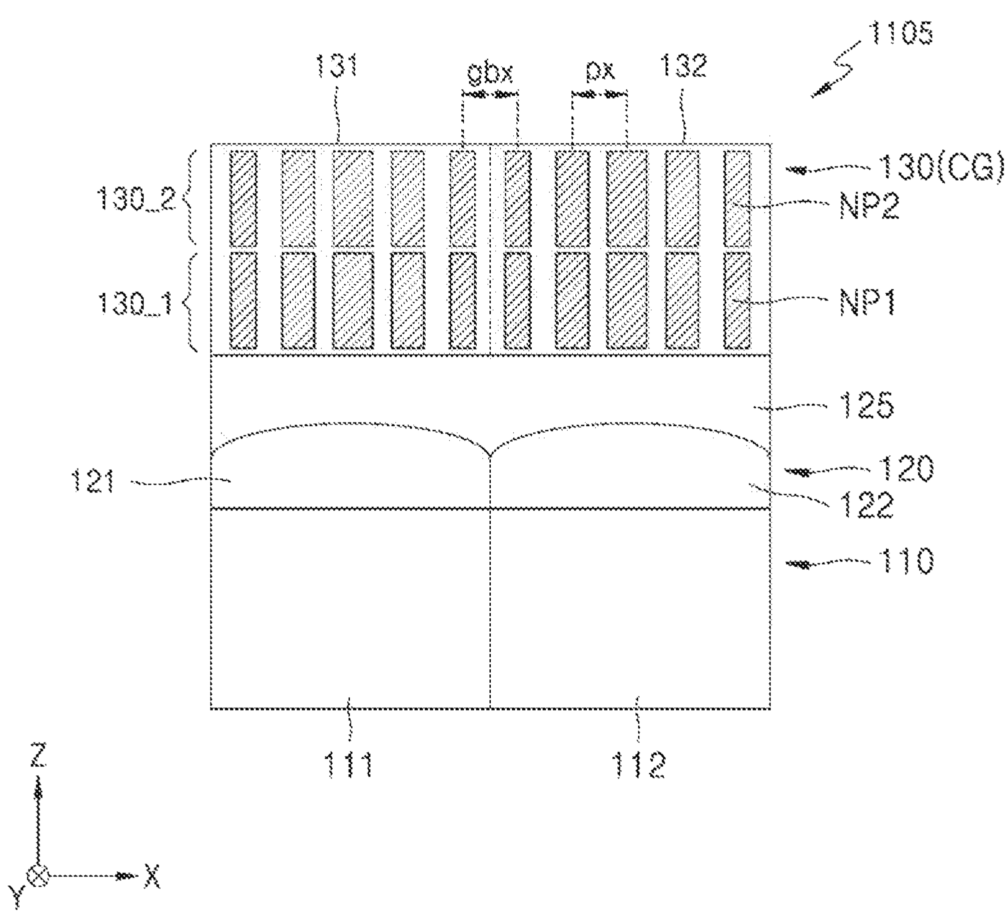

Referring to FIG. 16, a nano-optical microlens array 130 provided in a pixel array 1105 may have a multi-layer structure of two or more layers. For example, the nano-optical microlens array 130 may include a first nano-optical microlens array 130_1 on a filter layer 120 and a second nano-optical microlens array 130_2 on the first nano-optical microlens array 130_1. The first nano-optical microlens array 130_1 and the second nano-optical microlens array 130_2 may each include a plurality of nanostructures. For example, the first nano-optical microlens array 130_1 may include a plurality of first nanostructures NP1, and the second nano-optical microlens array 130_2 may include a plurality of second nanostructures NP2 on the plurality of first nanostructures NP1.

Such a multilayer structure may be selected when a structure with a large aspect ratio, for example, a structure with an aspect ratio of about 5 or more, is required in designing a shape of the nanostructures NP described above. When it is difficult to implement a high aspect ratio with a single layer structure, a process of manufacturing a first layer and a second layer separately may be used, and a substantially high aspect ratio may be implemented by the sum of heights of the first nanostructure NP1 and the second nanostructure NP2 aligned with each other downward. However, this is an example, and the first nanostructure NP1 may not be aligned with and the second nanostructure NP2. In this case, an interval between the nanostructures with a boundary between adjacent nano-optical microlenses therebetween may be satisfied in only one layer.

FIG. 16 illustrates a center group CG, and a multi-layer structure may also be applied to peripheral groups at various positions.

FIGS. 12 to 16 illustrate only the center group CG to illustrate modified shapes of the nano-optical microlens array 130 according to various embodiments, and as described above, a positional relationship between adjacent nano-optical microlenses and positional relationships between corresponding pixels in peripheral groups at various positions may be applied to the embodiments.

Figure 17:
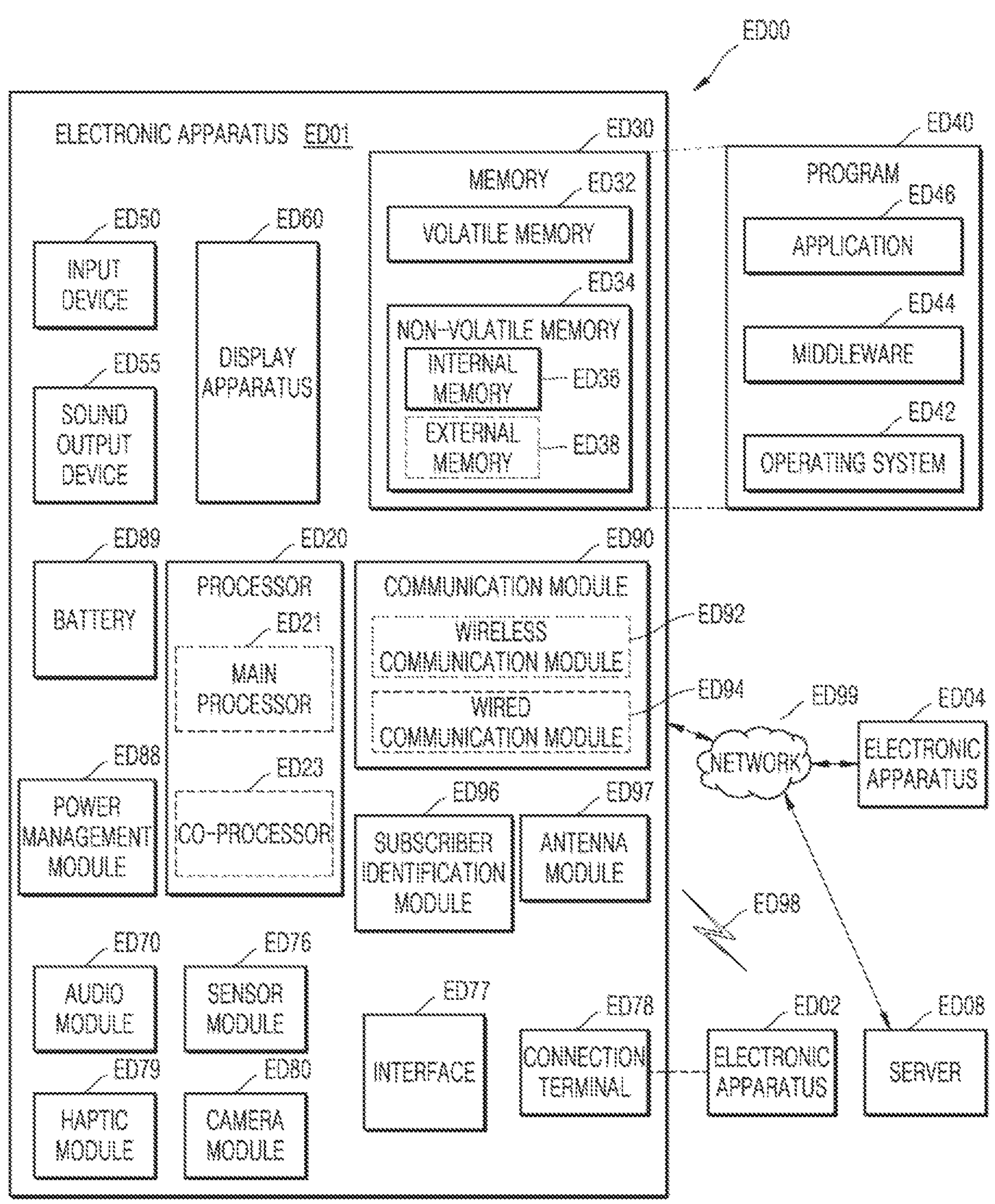
FIG. 17 is a block diagram schematically illustrating an electronic apparatus including an image sensor, according to an embodiment.
Figure 18:
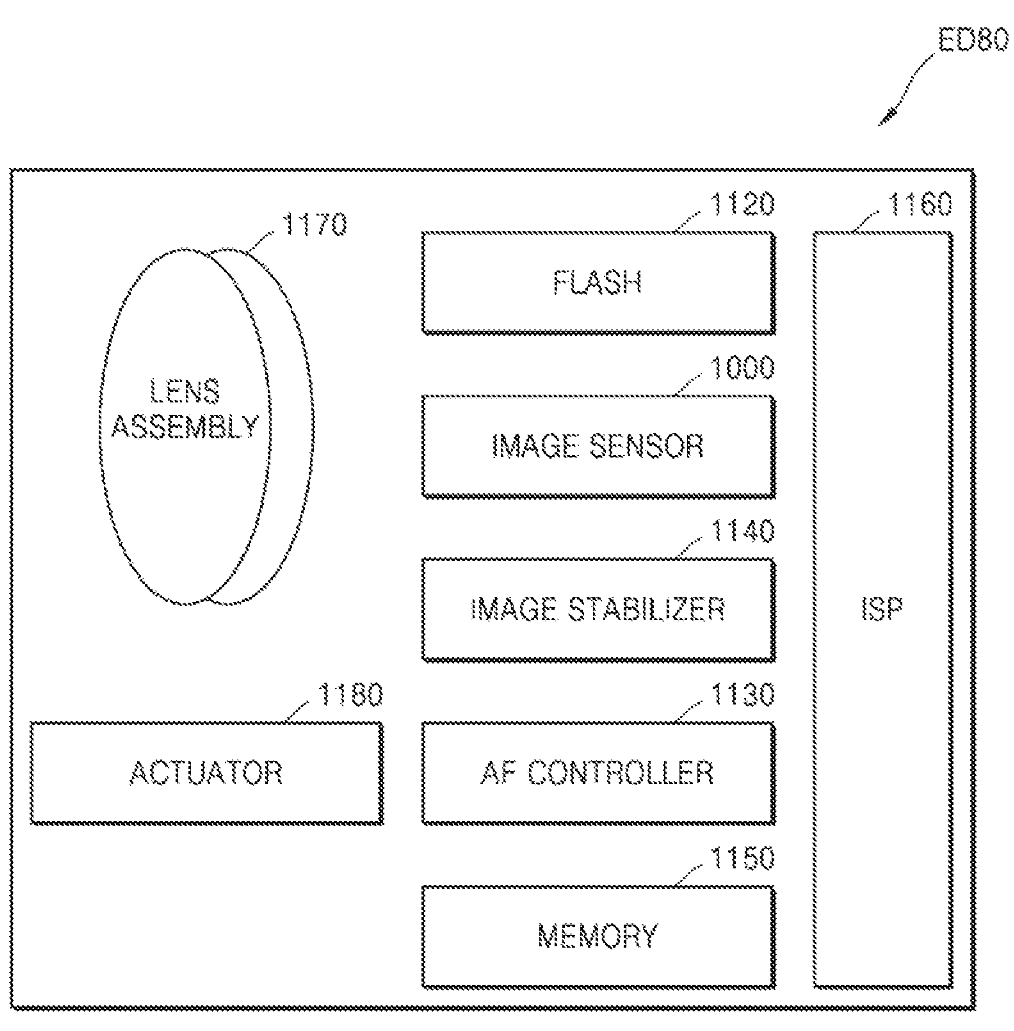
FIG. 18 is a block diagram schematically illustrating a camera module included in the electronic apparatus of FIG. 17.

FIG. 17 is a block diagram schematically illustrating an electronic apparatus including an image sensor according to embodiments, and FIG. 18 is a block diagram schematically illustrating a camera module included in the electronic apparatus of FIG. 17.

Referring to FIG. 17, in a network environment ED00, an electronic apparatus ED01 may communicate with another electronic apparatus ED02 through a first network ED98 (a short-range wireless communication network or so on) or may communicate with another electronic apparatus ED04 and/or a server ED08 through a second network ED99 (a long-distance wireless communication network or so on). The electronic apparatus ED01 may communicate with the electronic apparatus ED04 through the server ED08. The electronic apparatus ED01 may include a processor ED20, a memory ED30, an input device ED50, a sound output device ED55, a display apparatus ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60 and so on) of the components may be omitted from the electronic apparatus ED01, or other components may be added to the electronic apparatus ED01. Some of the components may be integrated in one circuit. For example, the sensor module ED76 (a fingerprint sensor, an iris sensor, an illuminance sensor, or so on) may be embedded in the display apparatus ED60 (a display or so on).

The processor ED20 may execute software (such as a program ED40) to control one or a plurality of other components (hardware, software components, and so on) of the electronic apparatus ED01 connected to the processor ED20 and may perform various data processing or arithmetic. The processor ED20 stores commands and/or data received from other components (the sensor module ED76, the communication module ED90, and so on) in a volatile memory ED32 and process the commands and/or the data stored in the volatile memory ED32 and store resulting data in a non-volatile memory ED34 as part of data processing or arithmetic. The processor ED20 may include a main processor ED21 (a central processing unit, an application processor, or so on) and a co-processor ED23 (a graphics processing unit, an image signal processor, a sensor hub processor, a communication processor, or so on) that may be operated independently or together therewith. The co-processor ED23 may use less power than the main processor ED21 and may perform a specialized function.

The co-processor ED23 may control functions and/or states related to some components (the display apparatus ED60, the sensor module ED76, the communication module ED90, and so on) of the electronic apparatus ED01 on behalf of the main processor ED21 while the main processor ED21 is in an inactive state (sleep state), or together with the main processor ED21 while the main processor ED21 is in an active state (the application execution state). The co-processor ED23 (an image signal processor, a communication processor, or so on) may be implemented as part of another component (the camera module ED80, the communication module ED90, or so on) functionally related thereto.

The memory ED30 may store a variety of data required by components (the processor ED20, the sensor module ED76, and so on) of the electronic apparatus ED01. Data may include, for example, input data and/or output data for software (such as the program ED40) and commands related thereto. The memory ED30 may include the volatile memory ED32 and/or the non-volatile memory ED34.

The program ED40 may be stored as software in the memory ED30 and may include an operating system ED42, middleware ED44, and/or an application ED46.

The input device ED50 may receive commands and/or data to be used in components (the processor ED20 and so on) of the electronic apparatus ED01 from an exterior (a user or so on) of the electronic apparatus ED01. The input device ED50 may include a remote controller, a microphone, a mouse, a keyboard, and/or a digital pen (a stylus pen or so on).

The sound output device ED55 may output a sound signal to the exterior of the electronic apparatus ED01. The sound output device ED55 may include a speaker and/or a receiver. The speaker may be used for general purposes such as multimedia playback or recording playback, and the receiver may be used to receive incoming calls. The receiver may be integrated into the speaker as part of the speaker or may be implemented as an independent separate device.

The display apparatus ED60 may visually provide information to the exterior of the electronic apparatus ED01. The display apparatus ED60 may include a control circuit for controlling a display, a hologram apparatus, or a projector and a corresponding device. The display apparatus ED60 may include touch circuitry configured to detect a touch, and/or sensor circuitry configured to measure the intensity of force generated by the touch (a pressure sensor or so on).

The audio module ED70 may convert audio into an electrical signal or may convert an electrical signal into audio. The audio module ED70 may acquire audio through the input device ED50 or may output audio through a speaker and/or a headphone of the sound output device ED55, and/or another electronic apparatus (the electronic apparatus ED02) directly or wirelessly connected to the electronic apparatus ED01.

The sensor module ED76 may detect an operation state (power, temperature, and so on) of the electronic apparatus ED01 or an external environmental state (user state or so on) and may generate an electrical signal and/or a data value corresponding to the detected state. The sensor module ED76 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or more designated protocols that may be used for the electronic apparatus ED01 to be connected directly or wirelessly to another electronic apparatus (the electronic apparatus ED02 or so on). The interface ED77 may include a high-definition multimedia interface (HDMI), a Universal Serial Bus (USB) interface, a secure digital (SD) card interface, and/or an audio interface.

A connection terminal ED78 may include a connector through which the electronic apparatus ED01 may be physically connected to another electronic apparatus (for example, the electronic apparatus ED02). The connection terminal ED78 may include an HDMI connector, a USB connector, an SD card connector, and/or an audio connector (a headphone connector or so on).

The haptic module ED79 may convert an electrical signal into a mechanical stimulus (vibration, movement, or so on) or an electrical stimulus that a user may perceive through a tactile or motor sense. The haptic module ED79 may include a motor, a piezoelectric effect element, and/or an electrical stimulation element.

The camera module ED80 may capture a still image and a video. The camera module ED80 may include a lens assembly including one or a plurality of lenses, image sensors, image signal processors, and/or flashes. The lens assembly included in the camera module ED80 may collect light emitted from an object to be imaged.

The power management module ED88 may manage power supplied to the electronic apparatus ED01. The power management module ED88 may be implemented as part of a power management integrated circuit (PMIC).

The battery ED89 may supply power to configuration elements of the electronic apparatus ED01. The battery ED89 may include a non-rechargeable primary cell, a rechargeable secondary cell, and/or a fuel cell.

The communication module ED90 may establish a direct (wired) communication channel and/or a wireless communication channel between the electronic apparatus ED01 and another electronic apparatus (the electronic apparatus ED02, the electronic apparatus ED04, the server ED08, or so on), and may support communication through the established communication channel. The communication module ED90 may operate independently of the processor ED20 (application processor or so on) and may include one or a plurality of communication processors that support direct communication and/or wireless communication. The communication module ED90 may include a wireless communication module ED92 (a cellular communication module, a short-range wireless communication module, a global navigation satellite system (GNSS) communication module, or so on) and/or a wired communication module ED94 (a Local Area Network (LAN) communication module, a power line communication module, or so on). A corresponding communication module among these communication modules may communicate with another electronic apparatus through the first network ED98 (a short-range communication network such as Bluetooth, WiFi Direct, or infrared data association (IrDA)) or the second network ED99 (a telecommunication network such as a cellular network, the Internet, or a computer network (a LAN, a wide area network (WAN), or so on)). Various types of these communication modules may be integrated into one configuration element (a single chip or so on) or may be implemented as a plurality of separate configuration elements (multiple chips). The wireless communication module ED92 may check and authenticate the electronic apparatus ED01 in a communication network such as the first network ED98 and/or the second network ED99 by using subscriber information (international mobile subscriber identifier (IMSI) and so on) stored in the subscriber identification module ED96.

The antenna module ED97 may transmit a signal and/or power to the outside (other electronic apparatuses or so on) or may receive a signal from the outside. An antenna may include a radiator made of a conductive pattern formed on a substrate (a printed circuit board (PCB) or so on). The antenna module ED97 may include one or a plurality of antennas. When a plurality of antennas are included, an antenna suitable for a communication method used in a communication network such as the first network ED98 and/or the second network ED99 may be selected from among the plurality of antennas by the communication module ED90. A signal and/or power may be transmitted or received between the communication module ED90 and other electronic apparatuses through the selected antenna. In addition to the antenna, other components (a radio frequency integrated circuit (RFIC) and so on) may be included as some of the antenna module ED97.

Some of the configuration elements may be connected to each other through a communication method (a bus, general purpose input and output (GPIO), serial peripheral interface (SPI), mobile industry processor interface (MIPI), or so on) between peripheral devices and may exchange signals (commands, data, and so on).

A command or data may be transmitted or received between the electronic apparatus ED01 and the electronic apparatus ED04, which is external, through the server ED08 connected to the second network ED99. The other electronic apparatuses ED02 and ED04 may be the same apparatuses as or different types of apparatuses from the electronic apparatus ED01. All or some of operations performed by the electronic apparatus ED01 may be performed by one or a plurality of the other electronic apparatuses ED02, ED04, and ED08. For example, when the electronic apparatus ED01 needs to perform a function or service, the electronic apparatus may request one or a plurality of other electronic apparatuses to perform the function or part or all of the service, instead of performing the function or service by itself. One or a plurality of other electronic apparatuses that receive a request may perform an additional function or service related to the request and may transmit a performance result to the electronic apparatus ED01. To this end, cloud computing technology, distributed computing technology, and/or client-server computing technology may be used.

Referring to FIG. 18, a camera module ED80 may include a lens assembly 1170, a flash 1120, an image sensor 1000, an image stabilizer 1140, an AF controller 1130, a memory 1150 such as a buffer memory, an actuator 1180, and/or an image signal processor (ISP) 1160.

The lens assembly 1170 may collect light emitted from an object which is an imaging target. The lens assembly 1170 may include at least one meta lens. The lens assembly 1170 may also include a path switching member that bends a path of light and directs the light toward the image sensor 1000. The camera module ED80 may have a vertical shape or a folded shape depending on presence or absence of the path switching member and the arrangement of the at least one optical lens. The camera module ED80 may include a plurality of lens assemblies 1170, and in this case, the camera module ED80 may serve as a dual camera, a 360-degree camera, or a spherical camera. Some of the plurality of lens assemblies 1170 may have the same lens property (an angle of view, a focal length, an auto focus, an F number, optical zoom, and so on) or may have different lens properties. The lens assembly 1170 may include a wide-angle lens or a telephoto lens.

The actuator 1180 may drive the lens assembly 1170. For example, at least one of the optical lens and the path switching member constituting the lens assembly 1170 may be operated by the actuator 1180. The optical lens may move along an optical axis, and a distance between adjacent lenses may be adjusted by moving at least a part of the optical lens included in the lens assembly 1170, and accordingly, an optical zoom ratio may be adjusted.

The actuator 1180 may adjust a position of one optical lens included in the lens assembly 1170 such that the image sensor 1000 is located at a focal length of the lens assembly 1170. The actuator 1180 may drive the lens assembly 1170 in response to an AF drive signal transmitted from the AF controller 1130.

The flash 1120 may emit light used to enhance light emitted or reflected from an object. Flash 1120 may emit visible light or infrared light. The flash 1120 may include one or a plurality of light emitting diodes (LEDs) (a red-green-blue (RGB) LED, a white LED, an infrared LED, an ultraviolet LED, and so on), and/or a Xenon Lamp. The image sensor 1000 may be the image sensor 1000 illustrated in FIG. 1 and may include any one of the pixel arrays 1100 according to the various embodiments described above, a combination thereof, or a modified pixel array. The image sensor 1000 may acquire an image corresponding to an object by converting light emitted or reflected from the object and transmitted through the lens assembly 1170 into an electrical signal.

The image sensor 1000 may include the nano-optical microlens array 130 described above, and each pixel may include a plurality of light sensing cells forming a plurality of channels, for example, a plurality of light sensing cells arranged in a 2×2 shape. Some of the pixels may be used as AF pixels, and the image sensor 1000 may generate an AF drive signal from signals of a plurality of channels in the AF pixels. As described above, the nano-optical microlens array 130 included in the image sensor 1000 adjusts the arrangement of nanostructures included in a peripheral group to reduce a channel difference, and thus, the accuracy of AF driving may be increased.

In response to movement of the camera module ED80 or the electronic apparatus 2301 including the camera module ED80, the image stabilizer 1140 moves one or more lenses included in the lens assembly 1170 or the image sensor 1000 in a preset direction, or controls (adjusts a read-out timing or so on) operating characteristics of the image sensor 1000 to reduce a negative influence of the movement. The image stabilizer 1140 may detect movement of the camera module ED80 or the electronic apparatus 2301 by using a gyro sensor (not illustrated) or an acceleration sensor (not illustrated) located inside or outside the camera module ED80. The image stabilizer 1140 may be implemented optically.

The AF controller 1130 may generate an AF drive signal from a signal value detected by an AF pixel of the image sensor 1000. The AF controller 1130 may control the actuator 1180 in response to the AF drive signal.

The memory 1150 may store some or all data of images acquired by the image sensor 1000 to perform a subsequent image processing operation. For example, when a plurality of images are acquired at a high speed, the acquired original data (Bayer-patterned data, high-resolution data, and so on) is stored in the memory 1150, only low-resolution images are displayed, and then original data of a selected (selected by a user or so on) image is transmitted to the image signal processor 1160. The memory 1150 may be integrated into the memory 2230 of the electronic apparatus 2201 or may be configured as a separate memory that independently operates.

The image signal processor 1160 may perform image processing for an image acquired by the image sensor 1000 or image data stored in the memory 1150. The image processing may include generation of a depth map, three-dimensional modeling, generation of a panorama, extraction of feature points, image synthesizing, and/or image compensation (noise reduction, resolution adjustment, brightness adjustment, and blurring), sharpening, softening, and so on. The image signal processor 1160 may control (controls exposure time, controls read-out timing, and so on) components (for example, the image sensor 1000 and so on) included in the camera module ED80. An image processed by the image signal processor 1160 may be stored back in the memory 1150 for further processing or may be provided to external components of the camera module ED80 (the memory 2230, the display device 2260, the electronic apparatus 2202, the electronic apparatus 2204, the server 2208, and so on). The image signal processor 1160 may be integrated into the processor 2220 or may be configured as a separate processor that operates independently of the processor 2220. When the image signal processor 1160 is configured as a processor independent of the processor 2220, an image processed by the image signal processor 1160 may be subjected to additional image processing by the processor 2220 and then displayed on the display device 2260.

The AF controller 1130 may be integrated into the image signal processor 1160. The image signal processor 1160 may generate an AF signal by processing signals from the autofocus pixels of the image sensor 1000, and the AF controller 1130 may convert the AF signal into a signal for driving the actuator 1180 and transmit the converted signal to the actuator 1180.

The electronic apparatus ED01 may further include one or a plurality of camera modules, each having different properties or functions. The camera module may also include a similar configuration to the camera module ED80 of FIG. 24, and an image sensor included in the camera module may be implemented as a charged coupled device (CCD) sensor and/or a complementary metal oxide semiconductor (CMOS) sensor and may include one or more sensors selected from image sensors with different properties, such as an RGB sensor, a black and white (BW) sensor, an infrared (IR) sensor, or an ultraviolet (UV) sensor. In this case, one of the plurality of camera modules ED80 may include a wide-angle camera, and each of the others may include a telephoto camera. Similarly, one of the plurality of camera modules ED80 may include a front camera and each of the others may include a rear camera.

Image sensors according to embodiments may be applied to various electronic apparatuses.

The image sensor 1000 according to an embodiment may be applied to a mobile phone or smartphone, a tablet or smart tablet, a digital camera or camcorder, a notebook computer, a television, a smart television, and so on. For example, the smartphone or smart tablet may include a plurality of high-resolution cameras, each including a high-resolution image sensor. By using high-resolution cameras, depth information of objects in an image may be extracted, the outfocusing of an image may be adjusted, or objects in an image may be automatically identified.

Also, the image sensor 1000 may be applied to smart refrigerators, security cameras, robots, medical cameras, and so on. For example, a smart refrigerator may automatically recognize the food in the smart refrigerator by using an image sensor and inform a user of presence or absence of certain food, the type of food input or output through a smartphone, and so on. The security cameras may provide ultra-high resolution images and recognize objects or people in images even in dark environments by using high sensitivity. The robots may provide high-resolution images when used in disaster or industrial sites that may not be directly accessed by people. The medical cameras may provide high-resolution images for diagnosis or surgery and may dynamically adjust a field of view.

Also, the image sensor 1000 may be applied to a vehicle. The vehicle may include a plurality of vehicle cameras arranged at various positions, and the plurality of vehicle cameras may each include the image sensor according to the embodiment. The vehicle may provide various types of information on the interior or surroundings of the vehicle to a driver by using the plurality of vehicle cameras and may automatically recognize objects or people in an image and provide information necessary for autonomous drive.

Although the above-described image sensor and electronic apparatus including the image sensor are described with reference to the embodiments illustrated in the drawings, this is merely an example, and those skilled in the art will understand that various modifications and other equivalent embodiments may be derived therefrom. Therefore, the embodiments should be considered from an illustrative perspective rather than a restrictive perspective. The scope of rights is indicated in the patent claims, not the foregoing description, and all differences within the equivalent scope should be interpreted as being included in the scope of rights.

The nanostructures included in the nano-optical microlens array of the image sensor described above is designed by considering a chief ray angle, and thus, performance degradation according to an incidence angel may be prevented, and the quality of an image acquired by the image sensor may be increased.

The image sensor described above may reduce a channel difference, and thus, autofocus performance may be increased.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image sensor comprising:

a sensor substrate comprising a plurality of pixels configured to detect light; and a nano-optical microlens array arranged on the sensor substrate, wherein the nano-optical microlens array comprises a plurality of nano-optical microlenses arranged to focus incident light on the plurality of pixels, wherein the plurality of nano-optical microlenses comprises a plurality of lens groups, wherein each lens group of the plurality of lens groups comprises a first nano-optical microlens, a second nano-optical microlens, a third nano-optical microlens, and a fourth nano-optical microlens each arranged in a 2×2 shape in a first direction and a second direction, wherein each of the first, the second, the third, and the fourth nano-optical microlenses of each lens group of the plurality of lens groups comprises a plurality of nanostructures arranged to focus incident light on a corresponding pixel from among the plurality of pixels, wherein the plurality of lens groups are classified into a center group at a center of the nano-optical microlens array and a plurality of peripheral groups spaced apart from the center of the nano-optical microlens array, wherein a center of each the first, the second, the third, and the fourth nano-optical microlens of each peripheral group of the plurality of peripheral groups is offset with respect to a center of the corresponding pixel, and offset distances of at least two of the first, the second, the third, and the fourth nano-optical microlenses of each peripheral group of the plurality of peripheral groups are different from each other, wherein for each peripheral group of the plurality of peripheral groups, a first offset distance between the center of the nano-optical microlens of the peripheral group corresponding to a pixel among the plurality of pixels that detects a first wavelength band of light and the center of the corresponding pixel is greater than a second offset distance between the center of the nano-optical microlens of the peripheral group corresponding to a pixel among the plurality of pixels that detects a second wavelength band of light and the center of the corresponding pixel, wherein for each peripheral group of the plurality of peripheral groups, the first wavelength band of light is the longest wavelength band of light detected by a pixel among the plurality of pixels corresponding to a nano-optical microlens of the peripheral group, and the second wavelength band of light is the shortest wavelength band of light detected by a pixel among the plurality of pixels corresponding to a nano-optical microlens of the peripheral group.

2. The image sensor of claim 1, wherein for each peripheral group of the plurality of peripheral groups, an offset distance between the center of the second nano-optical microlens and the center of the corresponding pixel is different from an offset distance between the center of the third nano-optical microlens and the center of the corresponding pixel.

3. The image sensor of claim 2, wherein, for each peripheral group of the plurality of peripheral groups, among the second nano-optical microlens and the third nano-optical microlens of the respective peripheral group, an offset distance between the center of the nano-optical microlens corresponding to a pixel that detects light of a short wavelength and the center of the corresponding pixel is less than an offset distance between the center of the other nano-optical microlens and the center of the corresponding pixel.

4. The image sensor of claim 1, wherein for each peripheral group of the plurality of peripheral groups, an offset distance between the center of the first nano-optical microlens and the center of the corresponding pixel is equal to an offset distance between the center of the fourth nano-optical microlens and the center of the corresponding pixel.

5. The image sensor of claim 1, wherein for each peripheral group of the plurality of peripheral groups, an offset distance between the center of the first nano-optical microlens and the center of the corresponding pixel and an offset distance between the center of the fourth nano-optical microlens and the center of the corresponding pixel are each less than an offset distance between the center of a nano-optical microlens, from among the second nano-optical microlens and the third nano-optical microlens of the respective peripheral group, corresponding to a pixel among the plurality of pixels that detects light of a long-longer wavelength and the center of the corresponding pixel.

6. The image sensor of claim 1, wherein the first, the second, the third, and the fourth nano-optical microlenses of each lens group of the plurality of lens groups are arranged to correspond to a pixel arrangement of a Bayer pattern, and wherein the longest wavelength band is blue light, and the shortest wavelength band is red light.

7. The image sensor of claim 6, wherein a first peripheral group among the plurality of peripheral groups is located at a position corresponding to a first chief ray angle, wherein a second peripheral group among the plurality of peripheral groups is located at a position corresponding to a second chief ray angle, and wherein, based on the first chief ray angle being greater than the second chief ray angle, a difference between the first offset distance and the second offset distance within the first peripheral group is greater than a difference between the first offset distance and the second offset distance within the second peripheral group.

8. The image sensor of claim 1, wherein each lens group of the plurality of lens groups comprises a plurality of intervals formed between border nanostructures among the plurality of nanostructures of the respective lens group, wherein the border nanostructures comprise nanostructures of the respective lens group that are directly facing each other and are separated by a boundary between adjacent nano-optical microlenses from among the first, the second, the third, and the fourth nano-optical microlenses of the respective lens group, and wherein, for each lens group of the plurality of lens groups, at least one interval of the plurality of intervals of the center group is different from at least one interval of the plurality of intervals of a peripheral group of the plurality of peripheral groups.

9. The image sensor of claim 8, wherein for each lens group of the plurality of lens groups, the plurality of intervals comprises:

a first interval defined between the first nano-optical microlens and the second nano-optical microlens;

a second interval defined between the first nano-optical microlens and the third nano-optical microlens;

a third interval defined between the fourth nano-optical microlens and the third nano-optical microlens; and a fourth interval defined between the fourth nano-optical microlens and the second nano-optical microlens.

10. The image sensor of claim 9, wherein the first interval, the second interval, the third interval, and the fourth interval of the center group are respectively referred to as a first reference interval, a second reference interval, a third reference interval, and a fourth reference interval, and wherein in a peripheral group, from among the plurality of peripheral groups, having an azimuth angle greater than 0 degrees and less than 90 degrees, the first interval is greater than the first reference interval, the second interval is greater than the second reference interval, the third interval is greater than the third reference interval, and the fourth interval is greater than the fourth reference interval.

11. The image sensor of claim 10, wherein a first peripheral group among the plurality of peripheral groups is located at a position corresponding to a first chief ray angle, wherein a second peripheral group among the plurality of peripheral groups is located at a position corresponding to a second chief ray angle, and wherein, based on the first chief ray angle being greater than the second chief ray angle:

a difference between the first interval of the first peripheral group and the first reference interval is greater than a difference between the first interval of the second peripheral group and the first reference interval, a difference between the second interval of the first peripheral group and the second reference interval is greater than a difference between the second interval of the second peripheral group and the second reference interval, a difference between the third interval of the first peripheral group and the third reference interval is greater than a difference between the third interval of the second peripheral group and the third reference interval, and a difference between the fourth interval of the first peripheral group and the fourth reference interval is greater than a difference between the fourth interval of the second peripheral group and the fourth reference interval.

12. The image sensor of claim 9, wherein the first interval, the second interval, the third interval, and the fourth interval of the center group are respectively referred to as a first reference interval, a second reference interval, a third reference interval, and a fourth reference interval, and wherein in a peripheral group, from among the plurality of peripheral groups, having an azimuth angle greater than 90 degrees and less than 180 degrees, the first interval is less than the first reference interval, the second interval is greater than the second reference interval, the third interval is less than the third reference interval, and the fourth interval is greater than the fourth reference interval.

13. The image sensor of claim 9, wherein the first interval, the second interval, the third interval, and the fourth interval of the center group are respectively referred to as a first reference interval, a second reference interval, a third reference interval, and a fourth reference interval, and wherein in a peripheral group, from among the plurality of peripheral groups, having an azimuth angle greater than 180 degrees and less than 270 degrees, the first interval is less than the first reference interval, the second interval is less than the second reference interval, the third interval is less than the third reference interval, and the fourth interval is less than the fourth reference interval.

14. The image sensor of claim 9, wherein the first interval, the second interval, the third interval, and the fourth interval of the center group are respectively referred to as a first reference interval, a second reference interval, a third reference interval, and a fourth reference interval, and wherein in a peripheral group, from among the plurality of peripheral groups, having an azimuth angle greater than 270 degrees and less than 360 degrees, the first interval is greater than the first reference interval, the second interval is less than the second reference interval, the third interval is greater than the third reference interval, and the fourth interval is less than the fourth reference interval.

15. The image sensor of claim 1, wherein each peripheral group of the plurality of peripheral groups comprises a plurality of intervals formed between border nanostructures among the plurality of nanostructures of the respective peripheral group, wherein the border nanostructures comprise nanostructures of the respective peripheral group that are directly facing each other and are separated by a boundary between adjacent nano-optical microlenses from among the first, the second, the third, and the fourth nano-optical microlenses of the respective peripheral group, and wherein, for each peripheral group of the plurality of peripheral groups, at least one interval of the plurality of intervals is different from an arrangement period of the plurality of nanostructures of the first, the second, the third, and the fourth nano-optical microlenses of the respective peripheral group.

16. The image sensor of claim 15, wherein a first peripheral group among the plurality of peripheral groups is located at a position corresponding to a first chief ray angle, wherein a second peripheral group among the plurality of peripheral groups is located at a position corresponding to a second chief ray angle, and wherein, based on the first chief ray angle being greater than the second chief ray angle, a difference between the at least one interval of the first peripheral group and the arrangement period of the plurality of nanostructures of the first peripheral group is greater than a difference between the at least one interval of the second peripheral group and the arrangement period of the plurality of nanostructures of the second peripheral group.

17. The image sensor of claim 15, wherein in a first peripheral group, among the plurality of peripheral groups, in a position where an azimuth angle defined on the nano-optical microlens array is greater than 0 degrees and less than 90 degrees, the plurality of intervals are larger than the arrangement period of the plurality of nanostructures of the first, the second, the third, and the fourth nano-optical microlenses of the first peripheral group.

18. The image sensor of claim 15, wherein in a first peripheral group, among the plurality of peripheral groups, in a position where an azimuth angle defined on the nano-optical microlens array is greater than 180 degrees and less than 270 degrees, the plurality of intervals are each smaller than the arrangement period of the plurality of nanostructures of the first, the second, the third, and the fourth nano-optical microlenses of the first peripheral group.

19. An image sensor comprising:

a sensor substrate comprising a plurality of pixels configured to detect light; and a nano-optical microlens array arranged on the sensor substrate, wherein the nano-optical microlens array comprises a plurality of nano-optical microlenses arranged to focus incident light on the plurality of pixels, wherein the plurality of nano-optical microlenses comprises a plurality of lens groups, wherein each lens group of the plurality of lens groups comprises a first nano-optical microlens, a second nano-optical microlens, a third nano-optical microlens, and a fourth nano-optical microlens each arranged in a 2×2 shape in a first direction and a second direction, wherein each of the first, the second, the third, and the fourth nano-optical microlenses of each lens group of the plurality of lens groups comprises a plurality of nanostructures arranged to focus incident light on a corresponding pixel among the plurality of pixels, wherein the plurality of lens groups are classified into a center group at a center of the nano-optical microlens array and a plurality of peripheral groups spaced apart from the center of the nano-optical microlens array, wherein each lens group of the plurality of lens groups comprises a plurality of intervals formed between border nanostructures from among the plurality of nanostructures of the respective lens group, wherein the border nanostructures comprise nanostructures of the respective lens group that are directly facing each other and are separated by a boundary between adjacent nano-optical microlenses from among the first, the second, the third, and the fourth nano-optical microlenses of the respective lens group, wherein, for each lens group of the plurality of lens groups, at least one interval of the plurality of intervals of the center group is different from at least one interval of the plurality of intervals of a peripheral group of the plurality of peripheral groups, and wherein a difference between the at least one interval of the plurality of intervals of the center group and the at least one interval of the plurality of intervals of a peripheral group of the plurality of peripheral groups increase as a chief ray angle of the peripheral group increases.

20. An image sensor comprising:

a sensor substrate comprising a plurality of pixels configured to detect light; and a nano-optical microlens array arranged on the sensor substrate, wherein the nano-optical microlens array comprises a plurality of nano-optical microlenses arranged to focus incident light on the plurality of pixels, wherein the plurality of nano-optical microlenses comprises:

a central group of nano-optical microlenses, wherein the central group is positioned at a center of the nano-optical microlens array; and a peripheral group of nano-optical microlenses, wherein the peripheral group is spaced apart from the center of the nano-optical microlens array, wherein each of the central group and the peripheral group respectively comprise a first nano-optical microlens, a second nano-optical microlens, a third nano-optical microlens, and a fourth nano-optical microlens each arranged in a 2×2 array, wherein a center of each of the first, the second, the third, and the fourth nano-optical microlenses of the peripheral group is offset with respect to a center of a pixel from among the plurality of pixels corresponding to the peripheral group, wherein an offset distance of at least two of the first, the second, the third, and the fourth nano-optical microlenses of the peripheral group are different from each other, wherein, among the first, the second, the third, and the fourth nano-optical microlenses of the peripheral group, an offset distance of the nano-optical microlens corresponding to a pixel among the plurality of pixels for sensing light in a first wavelength band is greater than an offset distance corresponding to a pixel among the plurality of pixels for sensing light in a second wavelength band, and wherein the first wavelength band of light is the longest wavelength band of light detected by a pixel among the plurality of pixels corresponding to a nano-optical microlens of the peripheral group, and the second wavelength band of light is the shortest wavelength band of light detected by a pixel among the plurality of pixels corresponding to a nano-optical microlens of the peripheral group.

* * * * *